(12) United States Patent
Showering et al.

(10) Patent No.: US 9,319,548 B2
(45) Date of Patent: *Apr. 19, 2016

(54) INTERACTIVE USER INTERFACE FOR CAPTURING A DOCUMENT IN AN IMAGE SIGNAL

(71) Applicant: Hand Held Products, Inc., Fort Mill, SC (US)

(72) Inventors: Paul Edward Showering, Chippenham (GB); Eize Oosting, Veenendaal (NL)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,608

(22) Filed: May 27, 2015

(65) Prior Publication Data

US 2015/0256695 A1 Sep. 10, 2015

Related U.S. Application Data

(63) Continuation of application No. 13/016,655, filed on Jan. 28, 2011, now Pat. No. 9,047,531.

(60) Provisional application No. 61/347,292, filed on May 21, 2010.

(51) Int. Cl.
*H04N 5/228* (2006.01)
*H04N 5/225* (2006.01)
(Continued)

(52) U.S. Cl.
CPC ............ *H04N 1/00718* (2013.01); *G06K 9/033* (2013.01); *G06K 9/228* (2013.01);
(Continued)

(58) Field of Classification Search
CPC ....... H04N 9/045; H04N 7/183; H04N 9/646; H04N 5/2351; H04N 5/2628; H04N 5/3532; G06T 5/006; G06T 3/4023; G06T 5/003; G08B 13/19628; G08B 13/19643

USPC ............ 348/207.99, 208.14, 231.9; 382/312, 382/313

See application file for complete search history.

(56) References Cited

U.S. PATENT DOCUMENTS

| 5,113,445 A | 5/1992 | Wang |
| 5,138,140 A | 8/1992 | Siemiatkowski et al. |

(Continued)

FOREIGN PATENT DOCUMENTS

| EP | 2388735 A3 | 4/2014 |
| EP | 2535842 B1 | 4/2014 |
| JP | 2001078136 A | 3/2001 |

OTHER PUBLICATIONS

European Search Report dated Oct. 10, 2012, for EP Appl. No. 12171111.3, published as Pub. No. EP2535842, on Dec. 19, 2012.

(Continued)

*Primary Examiner* — Trung Diep
(74) *Attorney, Agent, or Firm* — Additon, Higgins & Pendleton, P.A.

(57) ABSTRACT

Devices, methods, and software are disclosed for an interactive user interface for capturing a frame of image data having a representation of a feature. In an illustrative embodiment, a device includes an imaging subsystem, one or more memory components, and one or more processors. The imaging subsystem is capable of providing image data representative of light incident on said imaging subsystem. The one or more memory components include at least a first memory component operatively capable of storing an input frame of the image data. The one or more processors may be enabled for performing various steps. One step may include receiving the image data from the first memory component. Another step may include attempting to identify linear features defining a candidate quadrilateral form in the image data. Another step may include providing user-perceptible hints for guiding a user to alter positioning of the device to enhance a capability for identifying the linear features defining a candidate quadrilateral form in the image data.

20 Claims, 9 Drawing Sheets

(51) Int. Cl.
*G06K 9/22* (2006.01)
*H04N 1/00* (2006.01)
*G06K 9/03* (2006.01)
*G06K 9/32* (2006.01)

(52) U.S. Cl.
CPC ........... *G06K 9/3233* (2013.01); *H04N 1/0044* (2013.01); *H04N 1/00737* (2013.01); *H04N 1/00748* (2013.01); *H04N 1/00774* (2013.01); *H04N 2201/0081* (2013.01); *H04N 2201/0096* (2013.01); *H04N 2201/0098* (2013.01); *H04N 2201/3254* (2013.01); *H04N 2201/3273* (2013.01)

(56) References Cited

U.S. PATENT DOCUMENTS

| | | |
|---|---|---|
| 5,243,655 A | 9/1993 | Wang |
| 5,304,787 A | 4/1994 | Wang |
| 5,337,361 A | 8/1994 | Wang et al. |
| 5,381,013 A | 1/1995 | Cox et al. |
| 5,393,965 A | 2/1995 | Bravman et al. |
| 5,401,944 A | 3/1995 | Bravman et al. |
| 5,422,744 A | 6/1995 | Katz et al. |
| 5,471,533 A | 11/1995 | Wang et al. |
| 5,477,042 A | 12/1995 | Wang |
| 5,481,103 A | 1/1996 | Wang |
| 5,489,158 A | 2/1996 | Wang et al. |
| 5,490,217 A | 2/1996 | Wang et al. |
| 5,504,322 A | 4/1996 | Pavlidis et al. |
| 5,506,697 A | 4/1996 | Li et al. |
| 5,513,264 A | 4/1996 | Wang et al. |
| 5,521,366 A | 5/1996 | Wang et al. |
| 5,563,399 A | 10/1996 | Wang |
| 5,602,377 A | 2/1997 | Beller et al. |
| 5,637,849 A | 6/1997 | Wang et al. |
| 5,644,408 A | 7/1997 | Li et al. |
| 5,646,389 A | 7/1997 | Bravman et al. |
| 5,646,390 A | 7/1997 | Wang et al. |
| 5,691,773 A | 11/1997 | Wang et al. |
| 5,702,059 A | 12/1997 | Chu et al. |
| 5,703,349 A | 12/1997 | Meyerson et al. |
| 5,714,745 A | 2/1998 | Ju et al. |
| 5,719,384 A | 2/1998 | Ju et al. |
| 5,739,518 A | 4/1998 | Wang |
| 5,742,263 A | 4/1998 | Wang et al. |
| 5,760,382 A | 6/1998 | Li et al. |
| 5,763,864 A | 6/1998 | O'Hagan et al. |
| 5,773,806 A | 6/1998 | Longacre et al. |
| 5,773,810 A | 6/1998 | Hussey et al. |
| 5,783,811 A | 7/1998 | Feng et al. |
| 5,793,033 A | 8/1998 | Feng et al. |
| 5,796,090 A | 8/1998 | Pavlidis et al. |
| 5,811,784 A | 9/1998 | Tausch et al. |
| 5,815,200 A | 9/1998 | Ju et al. |
| 5,818,028 A | 10/1998 | Meyerson et al. |
| 5,831,674 A | 11/1998 | Ju et al. |
| 5,866,888 A | 2/1999 | Bravman et al. |
| 5,880,453 A | 3/1999 | Wang et al. |
| 5,917,913 A | 6/1999 | Wang |
| 5,932,862 A | 8/1999 | Hussey et al. |
| 5,965,863 A | 10/1999 | Parker et al. |
| 5,966,463 A | 10/1999 | Wang |
| 5,979,763 A | 11/1999 | Wang et al. |
| 6,002,491 A | 12/1999 | Li et al. |
| 6,061,400 A | 5/2000 | Pearlstein et al. |
| 6,175,922 B1 | 1/2001 | Wang |
| 6,233,060 B1 | 5/2001 | Shu et al. |
| 6,264,105 B1 | 7/2001 | Longacre et al. |
| 6,297,847 B1 | 10/2001 | Fisch |
| 6,343,740 B1 | 2/2002 | Ju et al. |
| 6,356,664 B1 | 3/2002 | Dunn et al. |
| 6,491,223 B1 | 12/2002 | Longacre et al. |
| 6,561,428 B2 | 5/2003 | Meier et al. |
| 6,578,766 B1 | 6/2003 | Parker et al. |
| 6,791,723 B1 | 9/2004 | Vallmajo et al. |
| 6,814,290 B2 | 11/2004 | Longacre |
| 6,834,807 B2 | 12/2004 | Ehrhart et al. |
| 6,850,916 B1 | 2/2005 | Wang |
| 6,901,170 B1 | 5/2005 | Terada et al. |
| 7,027,171 B1 | 4/2006 | Watanabe |
| 7,059,525 B2 | 6/2006 | Longacre et al. |
| 7,077,321 B2 | 7/2006 | Longacre et al. |
| 7,079,687 B2 | 7/2006 | Guleryuz |
| 7,080,786 B2 | 7/2006 | Longacre et al. |
| 7,104,456 B2 | 9/2006 | Parker et al. |
| 7,107,246 B2 | 9/2006 | Wang |
| 7,287,697 B2 | 10/2007 | Ehrhart et al. |
| 7,292,375 B2 | 11/2007 | Nishida |
| 7,293,712 B2 | 11/2007 | Wang |
| 7,331,523 B2 | 2/2008 | Meier et al. |
| 7,333,963 B2 | 2/2008 | Widrow et al. |
| 7,364,081 B2 | 4/2008 | Havens et al. |
| 7,372,485 B1 | 5/2008 | Bodnar et al. |
| 7,387,253 B1 | 6/2008 | Parker et al. |
| 7,398,930 B2 | 7/2008 | Longacre et al. |
| 7,409,091 B2 | 8/2008 | Sung et al. |
| 7,418,146 B2 | 8/2008 | Watanabe et al. |
| 7,428,002 B2 | 9/2008 | Monroe |
| 7,432,987 B2 | 10/2008 | Shan et al. |
| 7,447,332 B2 | 11/2008 | Horii et al. |
| 7,471,318 B2 | 12/2008 | Butterworth |
| 7,486,310 B2 | 2/2009 | Sakurai et al. |
| 7,523,866 B2 | 4/2009 | Longacre et al. |
| 7,525,570 B2 | 4/2009 | Kiely et al. |
| 7,545,535 B2 | 6/2009 | Zhen |
| 7,546,954 B2 | 6/2009 | Longacre et al. |
| 7,568,015 B2 | 7/2009 | Wang et al. |
| 7,586,536 B2 | 9/2009 | Kato et al. |
| 7,600,687 B2 | 10/2009 | Biss et al. |
| 7,613,363 B2 | 11/2009 | Platt et al. |
| 7,620,257 B2 | 11/2009 | Tanaka et al. |
| 7,635,084 B2 | 12/2009 | Wang et al. |
| 7,637,430 B2 | 12/2009 | Hawley et al. |
| 7,649,938 B2 | 1/2010 | Chen et al. |
| 7,690,572 B2 | 4/2010 | Meier et al. |
| 7,699,227 B2 | 4/2010 | Wang et al. |
| 7,717,342 B2 | 5/2010 | Wang |
| 7,720,295 B2 | 5/2010 | Watanabe et al. |
| 7,724,281 B2 | 5/2010 | Vale et al. |
| 7,726,575 B2 | 6/2010 | Wang et al. |
| 7,740,176 B2 | 6/2010 | Wang et al. |
| 7,742,077 B2 | 6/2010 | Sablak et al. |
| 7,770,799 B2 | 8/2010 | Wang |
| 7,777,780 B2 | 8/2010 | Oya et al. |
| 7,780,089 B2 | 8/2010 | Wang |
| 7,784,696 B2 | 8/2010 | Wang |
| 7,809,197 B2 | 10/2010 | Fedorovskaya et al. |
| 7,813,047 B2 | 10/2010 | Wang et al. |
| 7,841,532 B2 | 11/2010 | Longacre, Jr. et al. |
| 7,847,820 B2 | 12/2010 | Vallone et al. |
| 7,847,833 B2 | 12/2010 | Easwar et al. |
| 7,874,485 B2 | 1/2011 | Meier et al. |
| 7,881,715 B2 | 2/2011 | Kirani et al. |
| 7,889,229 B2 | 2/2011 | Chang et al. |
| 7,899,256 B2 | 3/2011 | Fedorovskaya et al. |
| 7,909,257 B2 | 3/2011 | Wang et al. |
| 7,922,088 B2 | 4/2011 | Wang |
| 7,941,002 B2 | 5/2011 | Samadani et al. |
| 7,941,005 B2 | 5/2011 | Tanaka |
| 8,014,592 B2 | 9/2011 | Lin |
| 8,027,096 B2 | 9/2011 | Feng et al. |
| RE42,881 E | 11/2011 | Vallmajo et al. |
| 8,160,366 B2 | 4/2012 | Nakamura et al. |
| 8,174,584 B2 | 5/2012 | Sambonsugi |
| 8,179,859 B2 | 5/2012 | Wang et al. |
| 8,186,595 B2 | 5/2012 | Wang |
| 8,191,785 B2 | 6/2012 | Qu et al. |
| 8,218,027 B2 | 7/2012 | Wang |
| 8,225,089 B2 | 7/2012 | Wang et al. |
| 8,226,009 B2 | 7/2012 | Havens et al. |
| 8,249,309 B2 | 8/2012 | Kurzweil et al. |
| 8,256,681 B2 | 9/2012 | Wang |
| 8,292,180 B2 | 10/2012 | Ehrhart et al. |

(56) References Cited

U.S. PATENT DOCUMENTS

| | | |
|---|---|---|
| 8,297,511 B2 | 10/2012 | Hawley et al. |
| 8,305,691 B2 | 11/2012 | Havens et al. |
| 8,317,104 B2 | 11/2012 | Havens et al. |
| 8,342,408 B2 | 1/2013 | Biss et al. |
| 8,366,002 B2 | 2/2013 | Wang et al. |
| 8,373,108 B2 | 2/2013 | Bremer et al. |
| 8,408,464 B2 | 4/2013 | Zhu et al. |
| 8,600,167 B2 | 12/2013 | Showering |
| 8,628,016 B2 | 1/2014 | Winegar |
| 9,047,531 B2 | 6/2015 | Showering et al. |
| 2001/0012413 A1 | 8/2001 | Longacre, Jr. et al. |
| 2002/0017565 A1 | 2/2002 | Ju et al. |
| 2002/0023215 A1 | 2/2002 | Wang et al. |
| 2002/0042736 A1 | 4/2002 | Wang et al. |
| 2002/0052185 A1 | 5/2002 | O'Hagan et al. |
| 2002/0056755 A1 | 5/2002 | Canini et al. |
| 2002/0065872 A1 | 5/2002 | Genske et al. |
| 2002/0096564 A1 | 7/2002 | Bellis et al. |
| 2002/0110197 A1 | 8/2002 | Pearlstein et al. |
| 2002/0140854 A1 | 10/2002 | Lan |
| 2003/0004827 A1 | 1/2003 | Wang |
| 2003/0042311 A1 | 3/2003 | Longacre et al. |
| 2003/0085282 A1 | 5/2003 | Parker et al. |
| 2003/0102376 A1 | 6/2003 | Meier et al. |
| 2003/0127519 A1 | 7/2003 | Ehrhart et al. |
| 2003/0164785 A1 | 9/2003 | Canini et al. |
| 2003/0168512 A1 | 9/2003 | Longacre, Jr. et al. |
| 2003/0189980 A1 | 10/2003 | Dvir et al. |
| 2003/0194310 A1 | 10/2003 | Canini et al. |
| 2003/0222144 A1 | 12/2003 | Meier et al. |
| 2004/0004128 A1 | 1/2004 | Pettinelli et al. |
| 2004/0094627 A1 | 5/2004 | Parker et al. |
| 2004/0134989 A1 | 7/2004 | Meier et al. |
| 2004/0175037 A1 | 9/2004 | Guleryuz |
| 2004/0206821 A1 | 10/2004 | Longacre, Jr. et al. |
| 2004/0256464 A1 | 12/2004 | Longacre et al. |
| 2004/0256465 A1 | 12/2004 | Longacre |
| 2004/0262392 A1 | 12/2004 | Longacre et al. |
| 2004/0262394 A1 | 12/2004 | Longacre et al. |
| 2004/0262395 A1 | 12/2004 | Longacre et al. |
| 2004/0262396 A1 | 12/2004 | Longacre et al. |
| 2005/0001035 A1 | 1/2005 | Hawley et al. |
| 2005/0104958 A1 | 5/2005 | Egnal et al. |
| 2005/0167504 A1 | 8/2005 | Meier et al. |
| 2005/0213821 A1 | 9/2005 | Matsuda |
| 2005/0213846 A1 | 9/2005 | Matsuda et al. |
| 2005/0264658 A1* | 12/2005 | Ray .................. G06K 9/00228 348/239 |
| 2005/0268003 A1 | 12/2005 | Wang et al. |
| 2006/0008122 A1* | 1/2006 | Kurzweil ............ G06K 9/228 382/114 |
| 2006/0061670 A1 | 3/2006 | Butterworth |
| 2006/0126093 A1 | 6/2006 | Fedorovskaya et al. |
| 2006/0175413 A1 | 8/2006 | Longacre et al. |
| 2006/0202036 A1 | 9/2006 | Wang et al. |
| 2006/0202038 A1 | 9/2006 | Wang et al. |
| 2006/0213999 A1 | 9/2006 | Wang et al. |
| 2006/0255144 A1 | 11/2006 | Meier et al. |
| 2006/0255150 A1 | 11/2006 | Longacre |
| 2006/0274171 A1 | 12/2006 | Wang |
| 2006/0278709 A1 | 12/2006 | Longacre et al. |
| 2006/0283952 A1 | 12/2006 | Wang |
| 2007/0002163 A1 | 1/2007 | Madej et al. |
| 2007/0036453 A1 | 2/2007 | Lindquist et al. |
| 2007/0045424 A1 | 3/2007 | Wang |
| 2007/0051814 A1 | 3/2007 | Ehrhart et al. |
| 2007/0063048 A1 | 3/2007 | Havens et al. |
| 2007/0080229 A1 | 4/2007 | Longacre et al. |
| 2007/0089168 A1 | 4/2007 | Wang et al. |
| 2007/0156021 A1 | 7/2007 | Morse et al. |
| 2007/0164111 A1 | 7/2007 | Wang et al. |
| 2007/0164114 A1 | 7/2007 | Longacre et al. |
| 2007/0171287 A1 | 7/2007 | Takeuchi |
| 2007/0236707 A1 | 10/2007 | Shoda |
| 2007/0267501 A1 | 11/2007 | Jovanovski et al. |
| 2007/0278310 A1 | 12/2007 | Biss et al. |
| 2007/0284448 A1 | 12/2007 | Wang |
| 2007/0291170 A1 | 12/2007 | Han et al. |
| 2008/0106597 A1 | 5/2008 | Amini et al. |
| 2008/0118144 A1 | 5/2008 | Lin |
| 2008/0144185 A1 | 6/2008 | Wang et al. |
| 2008/0144186 A1 | 6/2008 | Feng et al. |
| 2008/0144885 A1 | 6/2008 | Zucherman et al. |
| 2008/0164314 A1 | 7/2008 | Meier et al. |
| 2008/0198268 A1 | 8/2008 | Tullberg |
| 2008/0207262 A1 | 8/2008 | Shimizu et al. |
| 2008/0211910 A1 | 9/2008 | Niem et al. |
| 2008/0212685 A1 | 9/2008 | Masten |
| 2008/0239093 A1 | 10/2008 | Easwar et al. |
| 2008/0260285 A1 | 10/2008 | Ligeti |
| 2008/0261605 A1 | 10/2008 | Larsen |
| 2008/0273807 A1 | 11/2008 | Dauw et al. |
| 2008/0278580 A1 | 11/2008 | Bentkovski et al. |
| 2008/0294588 A1 | 11/2008 | Morris et al. |
| 2008/0294766 A1 | 11/2008 | Wang et al. |
| 2008/0296393 A1 | 12/2008 | Jovanovski et al. |
| 2008/0303903 A1 | 12/2008 | Bentley et al. |
| 2008/0309760 A1 | 12/2008 | Joyner et al. |
| 2009/0022429 A1 | 1/2009 | Longacre et al. |
| 2009/0026267 A1 | 1/2009 | Wang et al. |
| 2009/0026571 A1 | 1/2009 | Inagaki et al. |
| 2009/0039163 A1 | 2/2009 | Longacre et al. |
| 2009/0039167 A1 | 2/2009 | Wang et al. |
| 2009/0044003 A1 | 2/2009 | Berthiaume et al. |
| 2009/0045259 A1 | 2/2009 | Ehrhart et al. |
| 2009/0072038 A1 | 3/2009 | Li et al. |
| 2009/0086025 A1 | 4/2009 | Ngu et al. |
| 2009/0106095 A1 | 4/2009 | Ding et al. |
| 2009/0108072 A1 | 4/2009 | Wang |
| 2009/0121021 A1 | 5/2009 | Wang et al. |
| 2009/0135273 A1 | 5/2009 | Kusaka |
| 2009/0141117 A1 | 6/2009 | Elberbaum |
| 2009/0158364 A1 | 6/2009 | Swamidas |
| 2009/0190814 A1 | 7/2009 | Bouman et al. |
| 2009/0195676 A1* | 8/2009 | Cho .................. G06T 5/006 348/242 |
| 2009/0219411 A1 | 9/2009 | Marman et al. |
| 2009/0219433 A1 | 9/2009 | Higuchi et al. |
| 2009/0226052 A1 | 9/2009 | Fedele et al. |
| 2009/0242635 A1 | 10/2009 | Meier et al. |
| 2009/0273684 A1 | 11/2009 | Sambonsugi |
| 2009/0278937 A1 | 11/2009 | Botchen et al. |
| 2009/0288011 A1 | 11/2009 | Piran et al. |
| 2009/0290067 A1 | 11/2009 | Ishiga |
| 2009/0308926 A1 | 12/2009 | Canini et al. |
| 2009/0308927 A1 | 12/2009 | Longacre et al. |
| 2010/0008649 A1 | 1/2010 | Watanabe et al. |
| 2010/0044440 A1 | 2/2010 | Wang et al. |
| 2010/0078477 A1 | 4/2010 | Wang et al. |
| 2010/0084471 A1 | 4/2010 | Biss et al. |
| 2010/0108769 A1 | 5/2010 | Wang et al. |
| 2010/0124384 A1* | 5/2010 | Edgar .............. G06K 9/00483 382/313 |
| 2010/0133345 A1 | 6/2010 | Havens et al. |
| 2010/0147956 A1 | 6/2010 | Wang et al. |
| 2010/0176201 A1 | 7/2010 | Ehrhart et al. |
| 2010/0177207 A1 | 7/2010 | Fukuda |
| 2010/0187310 A1 | 7/2010 | Meier et al. |
| 2010/0258633 A1 | 10/2010 | Wang |
| 2010/0265344 A1 | 10/2010 | Velarde et al. |
| 2010/0276492 A1 | 11/2010 | Wang et al. |
| 2010/0276493 A1 | 11/2010 | Havens et al. |
| 2010/0278422 A1 | 11/2010 | Iketani |
| 2010/0289915 A1 | 11/2010 | Wang |
| 2010/0315536 A1 | 12/2010 | Wang |
| 2010/0316291 A1 | 12/2010 | Deng et al. |
| 2010/0329547 A1 | 12/2010 | Cavet |
| 2011/0004557 A1 | 1/2011 | Wang et al. |
| 2011/0017829 A1 | 1/2011 | Wang et al. |
| 2011/0032387 A1 | 2/2011 | Takahashi |
| 2011/0034176 A1 | 2/2011 | Lord et al. |
| 2011/0038563 A1 | 2/2011 | Bremer et al. |
| 2011/0040771 A1 | 2/2011 | Gilyadov et al. |
| 2011/0043873 A1 | 2/2011 | Maruo |

(56) References Cited

U.S. PATENT DOCUMENTS

| | | |
|---|---|---|
| 2011/0049245 A1 | 3/2011 | Wang |
| 2011/0057039 A1 | 3/2011 | Wang |
| 2011/0073654 A1 | 3/2011 | Wang et al. |
| 2011/0080414 A1 | 4/2011 | Wang |
| 2011/0080500 A1 | 4/2011 | Wang et al. |
| 2011/0085743 A1 | 4/2011 | Lei et al. |
| 2011/0089245 A1 | 4/2011 | Havens et al. |
| 2011/0096168 A1 | 4/2011 | Siann et al. |
| 2011/0108616 A1 | 5/2011 | Wang |
| 2011/0115824 A1 | 5/2011 | Lawrence et al. |
| 2011/0121067 A1 | 5/2011 | Longacre et al. |
| 2011/0128150 A1 | 6/2011 | Kanga et al. |
| 2011/0128403 A1 | 6/2011 | Easwar et al. |
| 2011/0143811 A1 | 6/2011 | Rodriguez |
| 2011/0163165 A1 | 7/2011 | Liu et al. |
| 2011/0163166 A1 | 7/2011 | Wang et al. |
| 2011/0168779 A1 | 7/2011 | Wang et al. |
| 2011/0174880 A1 | 7/2011 | Li et al. |
| 2011/0176744 A1 | 7/2011 | Ko et al. |
| 2011/0188752 A1 | 8/2011 | Wang |
| 2011/0193989 A1 | 8/2011 | Steinberg et al. |
| 2011/0199493 A1 | 8/2011 | Steinberg et al. |
| 2011/0206296 A1 | 8/2011 | Sakaguchi et al. |
| 2011/0235939 A1 | 9/2011 | Peterson et al. |
| 2011/0285873 A1 | 11/2011 | Showering |
| 2011/0285874 A1 | 11/2011 | Showering et al. |
| 2011/0309145 A1 | 12/2011 | Richardson et al. |
| 2012/0000981 A1 | 1/2012 | Meier et al. |
| 2012/0002066 A1 | 1/2012 | Wang |
| 2012/0018517 A1 | 1/2012 | Havens et al. |
| 2012/0048941 A1 | 3/2012 | Wang |
| 2012/0055988 A1 | 3/2012 | Qu et al. |
| 2012/0063686 A1 | 3/2012 | Dauw et al. |
| 2012/0075076 A1 | 3/2012 | Wang |
| 2012/0093434 A1 | 4/2012 | Banerjee et al. |
| 2012/0118974 A1 | 5/2012 | Germaine et al. |
| 2012/0134546 A1 | 5/2012 | Oicherman et al. |
| 2012/0138685 A1 | 6/2012 | Qu et al. |
| 2012/0187190 A1 | 7/2012 | Wang et al. |
| 2012/0193418 A1 | 8/2012 | Wang et al. |
| 2012/0196648 A1 | 8/2012 | Havens et al. |
| 2012/0196649 A1 | 8/2012 | Havens et al. |
| 2012/0198262 A1 | 8/2012 | Sauerwein et al. |
| 2012/0199654 A1 | 8/2012 | Zhu et al. |
| 2012/0223141 A1 | 9/2012 | Good et al. |
| 2012/0224040 A1 | 9/2012 | Wang |
| 2012/0234910 A1 | 9/2012 | Wang et al. |
| 2012/0234919 A1 | 9/2012 | Wang |
| 2012/0248195 A1 | 10/2012 | Feng |
| 2012/0248196 A1 | 10/2012 | Wang |
| 2012/0287910 A1 | 11/2012 | Wang et al. |
| 2012/0292384 A1 | 11/2012 | Wang et al. |
| 2012/0305649 A1 | 12/2012 | Qu et al. |
| 2012/0306904 A1 | 12/2012 | Francois et al. |
| 2012/0308091 A1 | 12/2012 | Wang |
| 2012/0318870 A1 | 12/2012 | Ren et al. |
| 2012/0320235 A1 | 12/2012 | Winegar |
| 2012/0325911 A1 | 12/2012 | Ding et al. |
| 2012/0325912 A1 | 12/2012 | Wang et al. |
| 2012/0331140 A1 | 12/2012 | Wang |
| 2013/0008964 A1 | 1/2013 | Hawley et al. |
| 2013/0021507 A1 | 1/2013 | Wang et al. |
| 2013/0043309 A1 | 2/2013 | Qu et al. |
| 2013/0043981 A1 | 2/2013 | Wang et al. |
| 2013/0075168 A1 | 3/2013 | Amundsen et al. |
| 2013/0092735 A1 | 4/2013 | Liu et al. |
| 2013/0112753 A1 | 5/2013 | Wang |
| 2013/0113791 A1 | 5/2013 | Isaacs et al. |
| 2013/0113967 A1 | 5/2013 | Wang |
| 2013/0135082 A1 | 5/2013 | Xian et al. |
| 2013/0140355 A1 | 6/2013 | Qu et al. |
| 2013/0142444 A1 | 6/2013 | Qu et al. |
| 2013/0146665 A1 | 6/2013 | Havens et al. |
| 2013/0201377 A1 | 8/2013 | Showering |
| 2013/0207902 A1 | 8/2013 | Showering |
| 2014/0078345 A1 | 3/2014 | Showering et al. |
| 2014/0100774 A1 | 4/2014 | Showering |

OTHER PUBLICATIONS

Communication Pursuant to Article 94(3) EPC, dated Oct. 22, 2012 in EP Appl. No. 12171111.3, published as Pub. No. EP2535842, on Dec. 19, 2012.

Search Report in EP Application 11165379.6, Dated Apr. 2, 2014, 3 Pages.

Office Action in EP Application 11165379.6, Dated Apr. 24, 2014, 6 pages.

Jang J-H et al.: "Fast Line Segment Grouping Method for Finding Globally more Favorable Line Segments" Pattern Recognition, Elsevier, GB, vol. 35, No. 10, Oct. 1, 2002, pp. 2235-2247 XP004366781 (13 pages).

Exam Report in related EP Application No. 11165379.6, Dated Jul. 27, 2015, 5 pages.

Chinese First Office Action in related CN Application No. 201110294177.3, Dated Jun. 15, 2015; English Translation provided, 16 pages.

* cited by examiner

INTERACTIVE USER INTERFACE FOR CAPTURING A DOCUMENT IN AN IMAGE SIGNAL

CROSS-REFERENCE TO RELATED APPLICATIONS

This application claims the benefit of U.S. patent application Ser. No. 13/016,655 for an Interactive User Interface for Capturing a Document in an Image Signal filed Jan. 28, 2011 (and published Nov. 24, 2011 as U.S. Patent Publication No. 2011/0285874), now U.S. Pat. No. 9,047,531, which claims the benefit of U.S. patent application Ser. No. 61/347,292 for a System Operative for Capture of a Frame of Image Data Having Representation of a Feature filed May 21, 2010. U.S. patent application Ser. No. 13/016,451 for a System for Capturing a Document in an Image Signal filed Jan. 28, 2011 (and published Nov. 24, 2011 as U.S. Patent Publication No. 2011/0285873), now U.S. Pat. No. 8,600,167, also claims the benefit of U.S. patent application Ser. No. 61/347,292. U.S. patent application Ser. No. 14/093,484 for a System for Capturing a Document in an Image Signal filed Dec. 1, 2013 (and published Mar. 20, 2014 as U.S. Patent Publication No. 2014/0078345) claims the benefit of U.S. patent application Ser. No. 13/016,451 and U.S. patent application Ser. No. 61/347,292. Each of the foregoing patent applications, patent publications, and patents is hereby incorporated by reference in its entirety.

FIELD OF THE INVENTION

The present disclosure relates to digital devices in general and in particular to a digital device having an imaging subsystem.

BACKGROUND

Digital devices having imaging subsystems, such as smart phones, digital cameras, and portable data scanning terminals, may be used for capturing image frames having representations of one or more features.

The availability of higher density image sensor arrays having an increased number of pixels, while providing certain advantages, can also present challenges. With image sensor arrays having increasing numbers of pixels, frames of image data captured with use of such terminals have increasing numbers of pixel values. While a greater number of pixel values generally allows capture of a frame having a higher resolution, the higher resolution can result in increased processing delays. Image sensor arrays are available in monochrome and color varieties; color image sensor arrays also provide increased data relative to monochrome.

The discussion above is merely provided for general background information and is not intended to be used as an aid in determining the scope of the claimed subject matter.

SUMMARY

Devices, methods, and software are disclosed for an interactive user interface for capturing a frame of image data having a representation of a feature. In an illustrative embodiment, a device includes an imaging subsystem, one or more memory components, and one or more processors. The imaging subsystem is capable of providing image data representative of light incident on said imaging subsystem. The one or more memory components include at least a first memory component operatively capable of storing an input frame of the image data. The one or more processors may be enabled for performing various steps. One step may include receiving the image data from the first memory component. Another step may include attempting to identify linear features defining a candidate quadrilateral form in the image data. Another step may include providing user-perceptible hints for guiding a user to alter positioning of the device to enhance a capability for identifying the linear features defining a candidate quadrilateral form in the image data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

The drawings are not necessarily to scale, emphasis instead generally being placed upon illustrating the principles of various embodiments. In the drawings, like numerals are used to indicate like parts throughout the various views.

DETAILED DESCRIPTION

Figure 1:
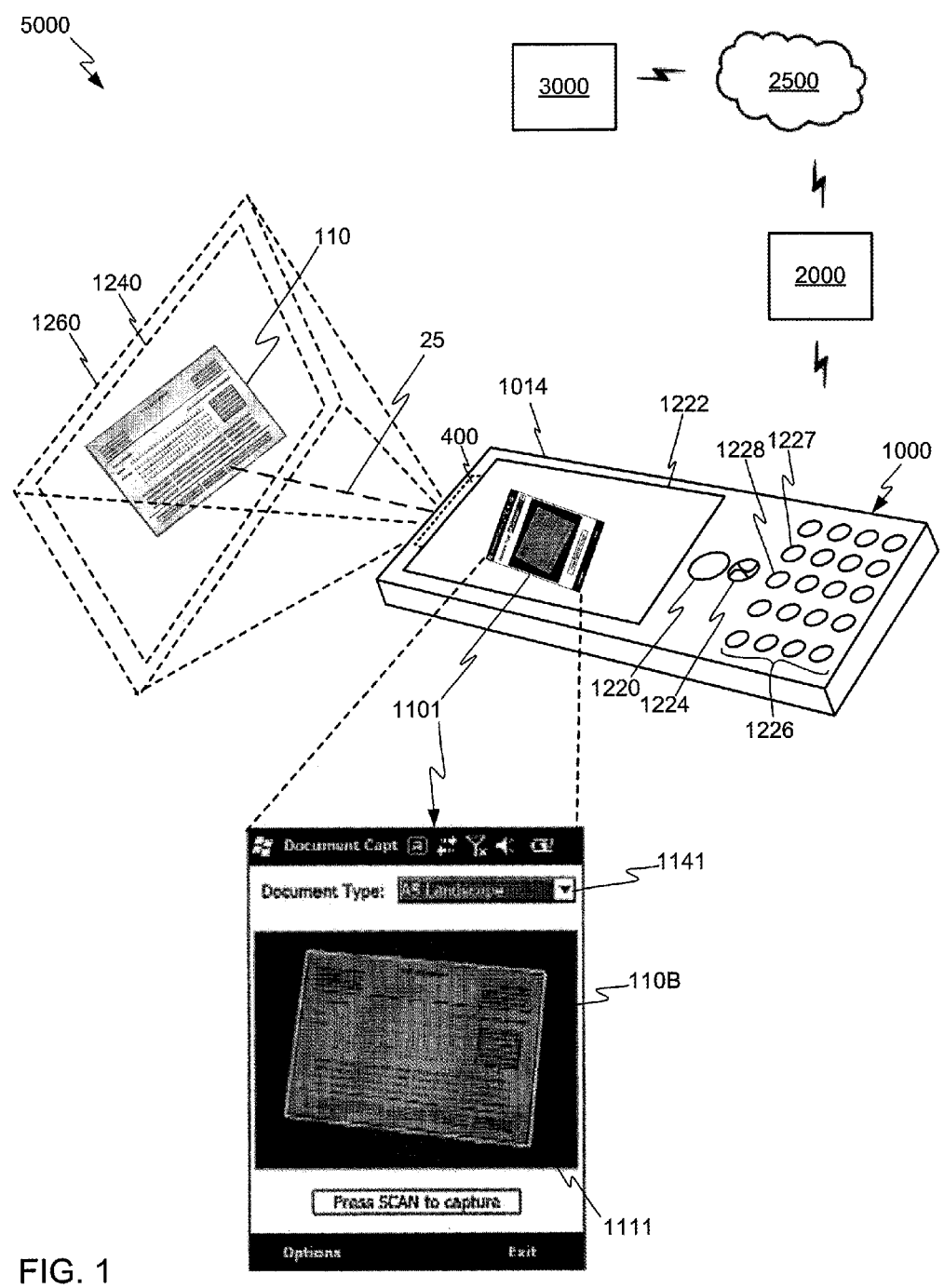
FIG. 1 depicts a simplified, mixed perspective and diagram view of a system that includes a digital device with an imaging subsystem, in accordance with an illustrative embodiment.
Figure 2:
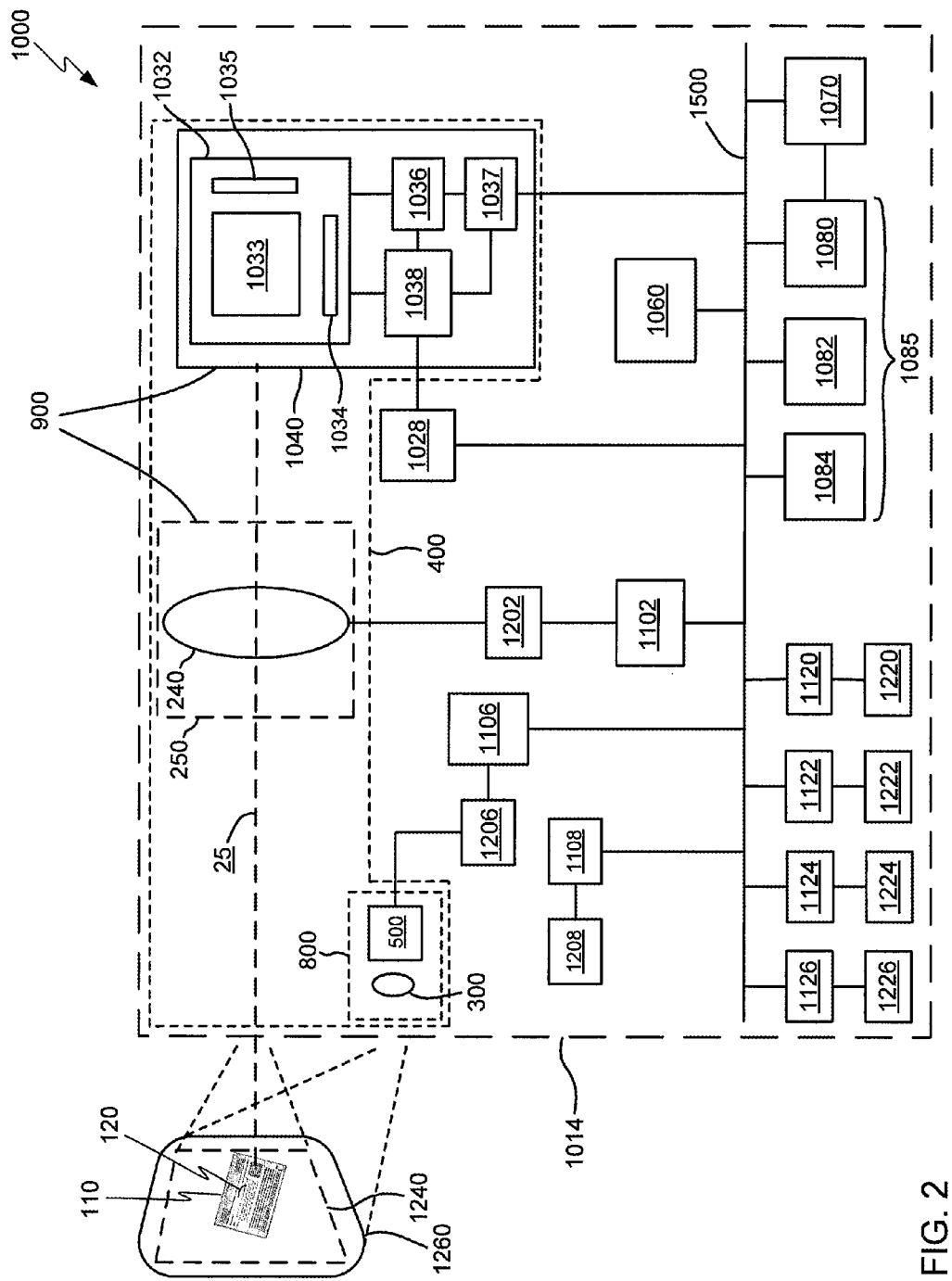
FIG. 2 depicts a schematic block diagram of a digital device with an imaging subsystem, in accordance with an illustrative embodiment.
Figure 3:
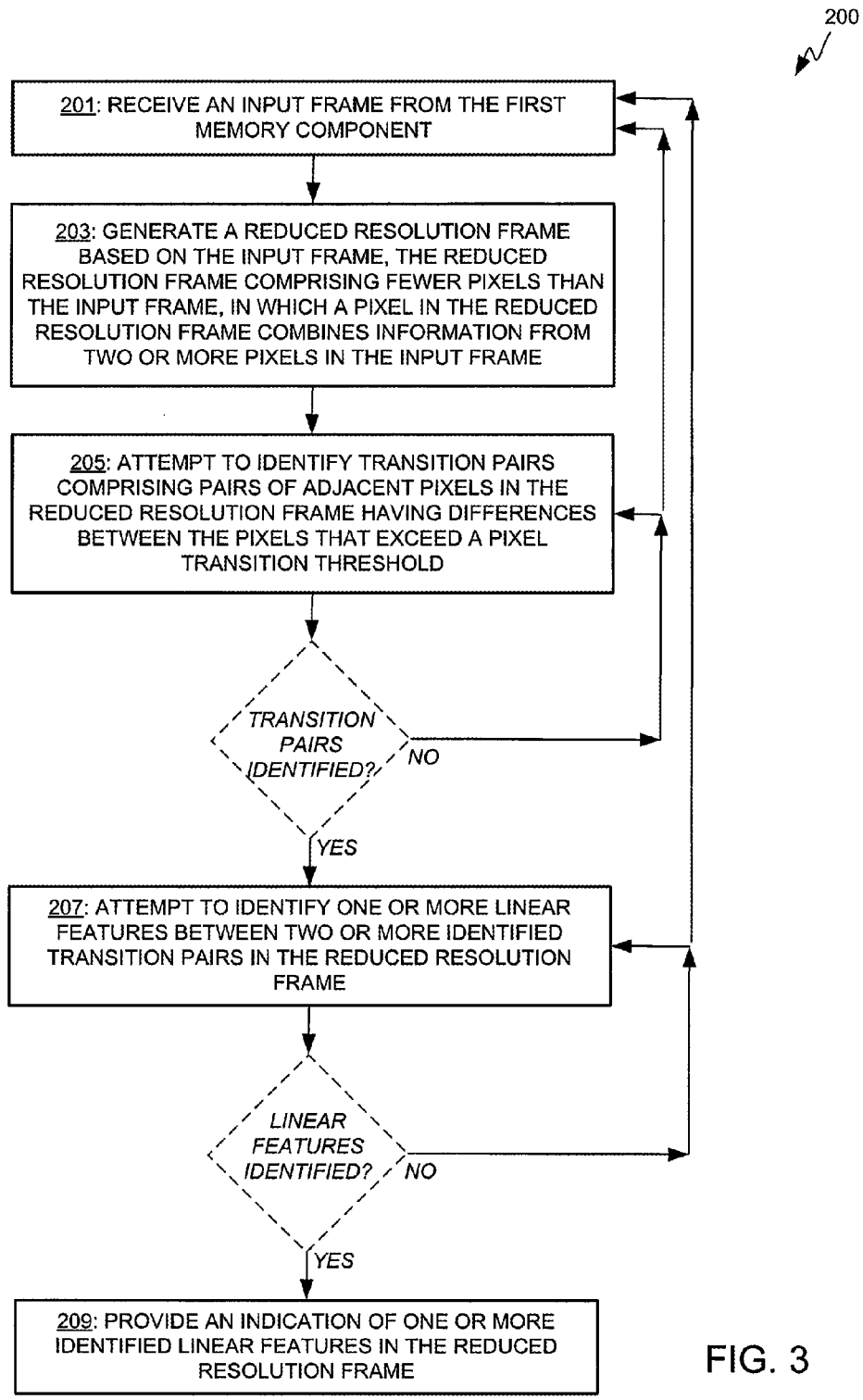
FIG. 3 depicts a flowchart for a method, in accordance with an illustrative embodiment.

FIG. 1 depicts a system 5000 for capturing a document 110 in an image signal, in accordance with an illustrative embodiment that includes a mobile device 1000, depicted here in perspective view. FIGS. 1 and 2 provide illustrative devices and systems that may be used for performing document capture methods, while FIG. 3 depicts an illustrative embodiment of a document capture method 200. As shown in FIGS. 1 and 2, mobile device 1000 may include an imaging subsystem 400 that has an imaging field of view 1240, that may be surrounded by a projected illumination field 1260, and which is directed at target document 110, in this illustrative embodiment. Mobile device 1000 and/or system 5000 in various embodiments may be illustratively enabled to capture a document 110 in an image signal, as is further outlined in the subsequent figures and in the following description.

Mobile device 1000 is depicted as a hand held style mobile computer in the illustrative embodiment of FIG. 1, and may also take the form of a smartphone, a mobile phone, a tablet or netbook computer, a laptop computer, an e-book reader, an indicia scanning terminal, or any of a wide range of other types of digital devices with imaging subsystems, in various embodiments. In the illustrative embodiment of FIG. 1, mobile device 1000 includes user interface elements including trigger 1220, display 1222, pointer mechanism 1224, and keyboard 1226 disposed on a hand held housing 1014. Two of the keys on keyboard 1225 are designated as a scan key 1227 and an enter key 1228, though which keys are used for such functions and where they are disposed on mobile device 1000 may be arbitrarily selected and may differ from the illustrative depiction in FIG. 1.

System 5000 can be operative to carry out a plurality of actions, which may include the following examples, which may characterize one illustrative embodiment:

1) A preview frame can be displayed on the display 1222 of the mobile device 1000 showing what the imaging subsystem 400 or camera sees, updated in real time or as close as is practicable to real time. The preview frame can have a lower resolution less than that of the image sensor array 1033.
2) The preview frame can be processed to locate the document.
3) If a document has been located, its outline can be denoted in the preview image with a quadrilateral border, the color of which is used to give information to the operator—a red border can indicate the document has been recognized but the resulting image is not optimal, a green border can indicate that the document has been recognized and the resulting image is optimal.
4) As part of the document recognition process the distance of the document can be calculated, and this distance can be used to set the focus of the lens assembly 250, which includes imaging lens or camera lens 240. For example, system 5000 can be operative so that a plane of optimum focus setting of lens assembly 250 is responsive to a distance to a target, as determined according to a distance detection method set forth herein.
5) Also, as part of the document recognition process, the incoming preview frame rate is analyzed. The frame rate varies according to the exposure time, which in turn varies according to the ambient light level. Accordingly, if the frame rate drops below a certain threshold then the camera's illumination subsystem 800 (e.g. an LED lamp) can be automatically energized.
6) In the case of the non-optimal image, further visual information can be given in the preview image to the operator to help them to improve the image quality—this may be done in the form of graphical "hints" or guidance indications that give clear instructions about things such as to how to move mobile device 1000.
7) The hints may show things such as straight arrows indicating which direction to move mobile device 1000, curved arrows indicating which direction to rotate the mobile device 1000, arrows drawn with exaggerated perspective indicating mobile device 1000 is to be moved closer to or further away from the document, plus in addition other graphical images indicating that the document is partly in shadow or that the mobile device 1000 is not being held steady enough.
8) The color of the hints will cycle so as to improve their visibility on both light or dark backgrounds, and they may also be animated.
9) When the frame has been determined to be optimal, the operator may signal to the mobile device 1000 by pressing a key or by some other action that a still image is to be captured and saved.
10) Once the image has been captured, it can be checked for sharpness. System 5000 can be operative in one embodiment so that only if it is sufficiently sharp will audible and/or visual indications be given to the operator that a captured frame has been saved.
11) The frame can be cropped/scaled/rotated as appropriate so as to leave just an image of the document itself. This process will create a document image of a resolution sufficient to fill the display screen of the mobile computer, and the document will be perpendicular within the image irrespective of its original orientation.
12) The processed frame can be displayed on the display 1222 of mobile device 1000 for final operator approval.
13) As soon as the image has been displayed, the crop/scale/rotation process may be repeated "in the background," this time to produce a larger image suitable for saving.
14) Once this second transformation process is complete, the operator may give their approval of the document image, which may be given by pressing a key of keyboard 1226 or by some other action.
15) System 5000 can be operative so that if approved, the image of a document will then be saved to a memory of mobile device 1000, e.g. a storage memory 1084, which can be provided e.g., by flash memory or a hard drive memory, and the document capture process may then be complete. System 5000 can be operative so that if the operator indicated that the document was not to be saved then the document capture process will start again immediately.

Any or all of these actions may be taken, in a variety of different orders, in various embodiments. Illustrative aspects of these actions are further elaborated elsewhere in this disclosure.

In various illustrative embodiments, system 5000 may be operative so that a preview window 1101 with a streaming preview image 1111 may be shown on the display 1222 of digital device 1000, as depicted in FIG. 1. The streaming preview image 1111 may show a reduced resolution real-time preview of the image frames being imaged by the camera or imaging subsystem 400. The preview image 1111 may serve a variety of useful purposes in promoting successful document capture. For example, an illustrative document capture processing implementation may allow a user to see a streaming document image 110B showing how document 110 is being imaged by mobile device 1000, and showing when target document 110 is relatively flat, well-lit, and encompassed within the field of view 1240 of the imaging subsystem 400. An illustrative document capture processing implementation may also provide a document profile type drop-down menu 1141 allowing the user to select a document profile type having a specified size and aspect ratio.

Display 1222 in various embodiments can incorporate a touch panel for navigation and virtual actuator selection in which case a user interface of mobile device 1000 can be provided by display 1222. User interface elements of mobile device 1000 can also be provided by configuring mobile device 1000 to be operative to be reprogrammed by decoding of programming bar code symbols. In another embodiment, a mobile device may be devoid of a display and can be in a gun style form factor. In various embodiments, mobile device 1000 may itself constitute a system for capturing a document 110 in an image signal, and in various embodiments, mobile device 1000 in combination with one or more external servers 2000, 3000 (depicted in block diagram), which may be connected over a network 2500, may together serve as a system for capturing a document 110 in an image signal. In the description herein, system 5000 may be described as being enabled or configured for various features, characteristics, or functions; and in various embodiments this may refer to mobile device 1000 alone, or in communication or cooperation with other elements of system 5000, being enabled or configured for those features, characteristics, or functions. Various elements of FIG. 1 are further described below.

FIG. 2 depicts a schematic block diagram of mobile device 1000 with imaging subsystem 400, in accordance with an illustrative embodiment that coincides with that of FIG. 1. Mobile device 1000 includes imaging subsystem 400, one or more memory components 1085, and a processor. Imaging subsystem 400 is capable of providing image data representative of light incident thereon. The one or more memory components 1085 include at least a first memory component, illustratively such as RAM 1080, that is operatively capable of at least temporarily or transiently storing an input frame of the image data, while other memory components may be used in various embodiments. The processor 1060 may be in communicative connection with executable instructions for enabling the processor 1060 for various steps. Those steps are illustratively depicted in FIG. 3, in accordance with an illustrative method 200, and certain aspects of image processing involved in those steps are illustratively depicted in FIGS. 4-6. Other referenced elements of FIG. 2 are introduced and various elements of FIG. 2 are further described below, after FIGS. 3-6 are further described.

In various illustrative methods, system 5000 may capture a document 110 in an image signal using an illustrative document detection and location process which may include several stages, which are briefly introduced here and described in further detail below, in accordance with various illustrative embodiments. Different document types may each have a profile which holds parameters such as its edge lengths, target color balance, etc., and these parameters in conjunction with a set of fixed parameters may be used in controlling the process. Different steps are presented as follows in an illustrative embodiment.

First, a frame of image data may be taken from a Direct-Show preview stream via a frame grabber, or a null renderer used as a frame grabber, for example, and re-sampled to a smaller size, referred to as a thumbnail. Then, a loop may be entered that uses differing criteria to detect edges, and chooses the one that gives the best results. For each iteration of the loop, the thumbnail may be searched along both the vertical and horizontal axes for changes in brightness and/or color that could signify a document edge. Up to two changes may be registered for each horizontal and vertical pass, in an illustrative embodiment. Edge segments may be built out of consecutive changes, and then segments that probably belong to the same edge may be grouped together. There may be a maximum of four groups as only two changes were registered along each axis, which should correspond to the four edges of the document. Straight line equations may be fitted to the four edge groups, and then solved as pairs of simultaneous equations to give four corner points. These points may then be transformed from 2D into 3D to give the original document's corner points in 3-dimensional space. The document dimensions may then be checked. After this, the document's position may be smoothed over a given period of time to remove some instability in the solution. The document may be checked for excessive shadows, and its position and orientation may be used to determine visual hints that can be given to the operator to show how to move mobile device 1000 to improve the image quality. Finally, once the operator may initiate a final document capture the resulting image may be checked for sharpness before being displayed. Once it is displayed, further processing may be carried out to transform it into a rectangular shape, reduce vignetting, correct any color imbalance, and sharpen it, in accordance with this illustrative embodiment.

For example, FIG. 3 illustrates a method 200 of operating a mobile device 1000 for identifying a document in an image signal, in accordance with an illustrative embodiment. For example, processor 1060 may be in communicative connection with executable instructions that enable processor 1060 for performing the steps of method 200. As shown in the illustrative embodiment of FIG. 3, method 200 includes step 201, of receiving an input frame from the first memory component, illustratively such as RAM 1080. This is followed by step 203 of generating a reduced resolution frame based on the input frame, the reduced resolution frame comprising fewer pixels than the input frame, in which a pixel in the reduced resolution frame combines information from two or more pixels in the input frame. Step 205 includes attempting to identify transition pairs comprising pairs of adjacent pixels in the reduced resolution frame having differences between the pixels that exceed a pixel transition threshold. If such transition pairs are identified, then step 207 may be performed, of attempting to identify one or more linear features between two or more identified transition pairs in the reduced resolution frame. If such linear features are identified, this can be followed by step 209, of providing an indication of one or more identified linear features in the reduced resolution frame.

Such linear features may be indicative of the edges of an image of a rectangular document 110 in an image signal read by digital device 1000, and may be used to locate or isolate the image of the rectangular document 110 in the image signal. The image signal may be generated by the imaging subsystem 400 of mobile device 1000, and may include an image of all or part of a target document 110 within a field of view 1240 of the imaging subsystem 400. The image of the document 110 may not be rectangular even if the target document 110 is rectangular, due to effects such as skew based on perspective angle between the mobile device 1000 and the document 110, and various steps disclosed herein may be used to compensate for or correct such skew. In various illustrative embodiments of mobile device 1000 and method 200, techniques for detecting and capturing a document may be typically capable of locating a document in a real-time 320×240 video stream image signal in less than 40 ms per frame, as an illustrative example, though other periods of time greater and less than this value are applicable in different embodiments. A target document 110 may include a document, a package, another type of substrate, or any substantially rectangular form having an interpretable feature thereon, such as writing or other form of indicia that is susceptible of being decoded or interpreted, for example.

FIGS. 4-8 graphically depict aspects of a process for detecting or identifying features, such as pixel transition pairs and linear features that may be indicative of document edges, leading to identifying and capturing an image of document 110 in a frame of data 301 imaged by mobile device 1000, in accordance with illustrative embodiments which may coincide with the illustrative method 200 of FIG. 3. FIGS. 4-8 are further described below.

In various embodiments, an image signal processing driver or application may be incorporated in mobile device 1000. The image signal processing driver may direct the process of loading frames of image data from the image sensor array 1033 to a buffer memory component such as RAM 1080 to be available to processor 1060. This may be in preparation for step 201 of receiving an input frame from the first memory component, such as RAM 1080. In an illustrative embodiment, mobile device 1000 can incorporate a version of Direct-Show Media Management software from MICROSOFT Corporation of Redmond, Wash. In various other embodiments, mobile device 1000 can incorporate another video driver or other image signal driver.

In an illustrative embodiment, step 203 may involve a frame of image data being taken from the DirectShow preview stream via a frame grabber or null renderer, and resampled to a smaller size, referred to as a thumbnail. In this illustrative embodiment, the thumbnail is a reduced resolution frame based on the input frame of image data from the preview stream, the thumbnail comprising fewer pixels than the input frame. Generating the reduced resolution frame further may include sectioning the input frame into groups of pixels, and for each of the groups of pixels, averaging one or more properties of the pixels in the group of pixels and generating an averaged pixel having the averaged properties of the group of pixels, in various illustrative embodiments. Each of the pixels in the thumbnail may therefore combine information from two or more pixels in the input frame. As an illustrative example, the initial input frame may be divided among sets of four pixels in 2×2 arrangements, and each of those 2×2 pixel sets may be averaged or otherwise combined, according to brightness, color, or both, into a single representative pixel in place of the original pixel set. Other sizes of pixel sets or methods of reducing the pixel count or amount of data in the initial image frame, such as combining sets of nine pixels in 3×3 arrangements, or other groupings, may also be used in different embodiments.

Various embodiments of a document capture process may be performed using substantially all the groups of pixels in the input frame and applying the methods for generating substantially all the pixels in the thumbnail, where the process may include minor errors and discrepancies that may affect one of more pixels that do not materially alter the process at large. For example, minor errors may be caused by defective imaging array pixels, radiation effects, minor random downloading errors, or other minor effects that may interfere with a relatively small number of pixels, without materially affecting the process of each group of pixels in the input frame being processed to generate each pixel in the reduced resolution frame, with the understanding that "each" may be taken to mean "substantially each" rather than "absolutely each one", according to various illustrative embodiments.

During the search, mobile device 1000 may be displaying the preview stream frames on display 1222. System 5000 may be operative so that while preview stream frames are being generated and displayed, system 5000 may be buffering higher resolution frames (e.g., 1600×1200, 1280×1024) from which the preview stream frames can be derived. Responsively to a command being activated to save a frame or image (e.g. representation of a document), e.g. by actuation of a scan key 1227 of keyboard 1225, a buffered higher resolution frame corresponding to a lower resolution frame processed for quality detection can be processed for saving. The higher resolution frames in one example can have a pixel count equal to a pixel count of image sensor array 1033 (e.g., 1600×1200), or a similar higher resolution (e.g., 1280×1024). Any step of buffering an image data frame transiently or otherwise temporarily may be understood to include storing the image data frame.

Additionally, the preview stream may already be a reduced resolution version of the full resolution imaging data being imaged by mobile device 1000, so that in this illustrative embodiment, the imaging driver generates a first reduced resolution image frame or series of frames, while a document identification application may generate a second-level frame that has its resolution reduced further from the first-round reduced resolution image frame from the imaging driver. In various other embodiments, various other processes may be involved in generating the reduced resolution frame or frames, which may involve only a single step of resolution reduction from the full resolution input frames, or any number and manner of resolution reduction steps.

For example, in one illustrative embodiment, mobile device 1000 may have an imager that merges a high resolution monochrome imager with a relatively lower resolution color imager such as a 640×480 pixel array Video Graphics Array (VGA) color imager on the same imaging chip, as an illustrative example. In this illustrative embodiment, the color imager may be used for a streaming preview display, while the high resolution imager may be used for final document capture, for example.

While the thumbnail has reduced resolution and a reduced amount of data compared with a higher resolution frame on which it is based, this enables a reduced processing burden and a reduced duration of time for the processor to perform subsequent steps involved in identifying and capturing an image of a document, such as steps of identifying pixel transition pairs and linear features.

As an illustrative example, a preview stream image frame of reduced resolution may be further reduced prior to image processing for document feature detection. For example, the input to a 640×480 VGA color imager may be reduced in resolution to one quarter to generate an original preview image, with each group of 2×2 pixels in the original imager signal being averaged or otherwise combined to generate a single pixel in the original preview image, in an illustrative embodiment. This original preview image can illustratively be 320×240 R5G6B5, but can be reduced in resolution a second time, illustratively being re-sampled and converted to 160×120 R8G8B8 before the detection process starts. Such processing can provide various advantages, for example it may be faster to search this smaller-sized 3 bytes-per-pixel image for edges. Also, such processing may remove some fine detail from the document that could be mistaken for an edge. Various other illustrative embodiments may include only a single step of resolution reduction, and/or may use other approaches in reducing the resolution to generate a rapid edge detection frame.

For example, in one illustrative embodiment, a mobile device 1000 may be able to generate reduced resolution linear feature detection thumbnail frames, and perform a full complement of linear feature detection and document capture processes on these reduced resolution linear feature detection thumbnail frames, at a frame rate of around seven to ten frames per second, for example. Other reduced resolution linear feature detection frame rates both higher and lower than this may be used in other embodiments.

Linear feature identifying steps may be performed in a loop after the thumbnail is created based on the input frame of image data. This is illustrated in FIG. 3, in which both identifying steps 205 and 207 may continuing iteratively looping before one or more of the sought features are identified. The number of each feature sought and the number of loops performed for seeking the features may be different in different embodiments. Different criteria may be used to detect edges, and one that gives the best results may be chosen, in various embodiments.

For example, a step of identifying pixel transitions may involve the thumbnail being searched, iteratively in a loop, along scan lines in both horizontal and vertical directions for changes in brightness and/or color between adjacent pixels, that could signify a document edge. In other words, each adjacent pair of pixels along each scan line may be evaluated to evaluate whether the two pixels in the pair are different enough, either in absolute terms or relative to other adjacent pixel pairs in the thumbnail, that they have some likelihood of representing an edge of a document.

Figure 4:
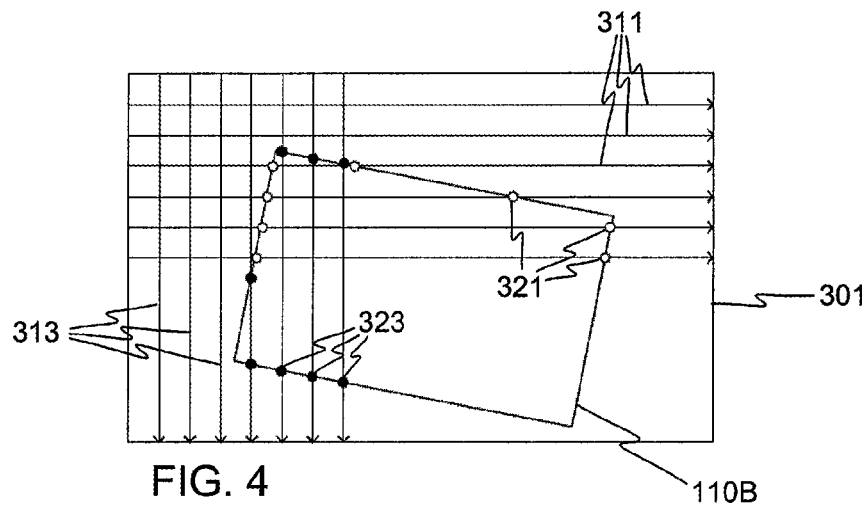
FIGS. 4-8 depict simplified views of various aspects of processing image frames for detecting and capturing a document, in accordance with various illustrative embodiments.

This is illustratively depicted in FIG. 4, which depicts an image frame 301 corresponding to a frame of image data taken from part or all of a frame of pixels of image sensor array 1033. For clarity, only a few illustrative horizontal scan lines 311 and vertical scan lines 313 are shown in FIG. 4. In an illustrative embodiment, no more than two candidate pixel transition pairs may be registered for each horizontal scan line 311 and each vertical scan line 313. FIG. 4 also depicts white circles to indicate identified horizontal pixel transition pairs 321 along horizontal scan lines 311, and dark circles to indicate identified vertical pixel transition pairs 323 along vertical scan lines 313.

While a reduced resolution frame may be used for rapidly detecting and identifying features, such as pixel transition pairs and linear features, indicative of an imaged document in various embodiments, as indicated above, a higher resolution, frame e.g. of resolution equal to the resolution of image sensor array 1033 or of other higher resolution can be processed for detecting indicative features, in various embodiments in which processing power is sufficient for rapid feature detection at higher resolution.

FIGS. 5-8 depict additional aspects of building on identified pixel transition pairs to identify linear features such as edge segments, aligned groups of edge segments, and intersections of edge segment groups likely to define corners of a document image, and then identifying and compensating for perspective skew, to map an image of a 2D document in a 3D space into a normalized 2D image of the document. A brief overview of these aspects may be provided as follows. Various features indicative of a document and that may be detected as part of a process of detecting and identifying an image of a document, such as pixel transition pairs, edge segments, aligned edge segment groups, and edge segment group corner intersections, may collectively be referred to as document indicative features or indicative features, for example, in that they indicate potential features of a document such as edges of a document. Any of these features indicative of a document, as well as an identified document fragment, a partially identified document, or an identified document, may collectively be considered to be identified linear features in the reduced resolution frame, in various illustrative embodiments.

Figure 5:
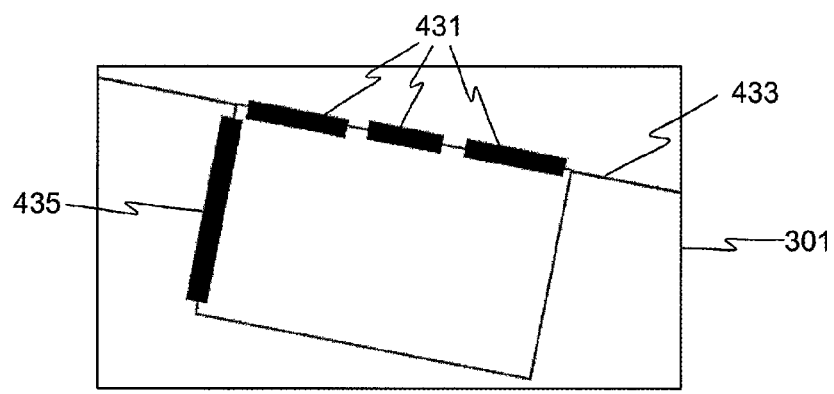
Figure 6:
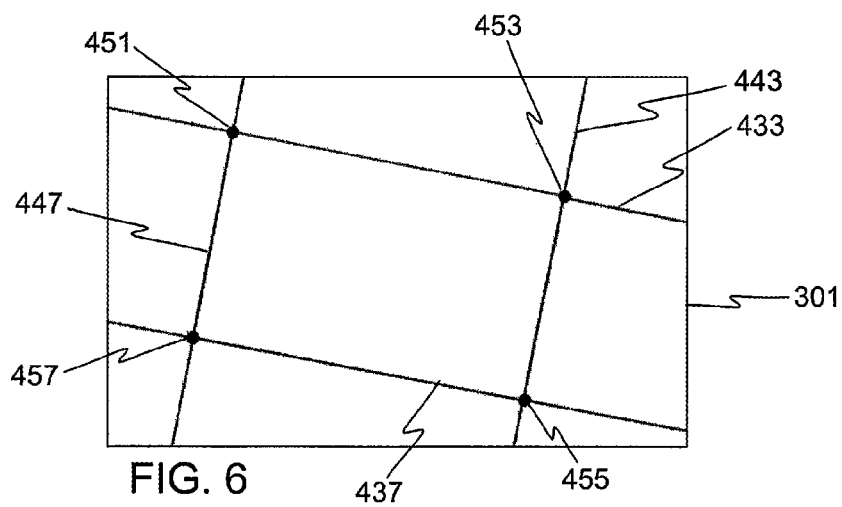

As FIG. 5 depicts, candidate linear features likely to be edge segments may be identified out of consecutive pixel transition pairs, and then edge segments that are aligned and show a likelihood of belonging to the same edge may be grouped together. There may be a maximum of four aligned edge segment groups as only two pixel transition pairs are registered along each scan line or axis in this illustrative embodiment, which should correspond to the four edges of the document. Straight line equations can be fitted to the four edge groups, and then solved as pairs of simultaneous equations to give four corner points, as depicted in FIG. 6. These points can then be transformed from 2D into 3D to give the original document's corner points in 3-dimensional space, which is further described below with reference to FIGS. 7 and 8.

The document dimensions can then be checked after calculating its physical size by relating its apparent size in pixels to the known optical characteristics of the imager lens assembly 250, for example. After this, the document's position may be smoothed over a given period of time to remove some instability in the solution. The document can be checked for excessive shadows, and its position and orientation can be used to determine user hints, illustratively in the form of graphical icons that offer hints on improved positioning, that can be given to the operator to show how to move the mobile device 1000 to improve the image quality. Finally, once the operator initiates the final document capture, the resulting image can be checked for sharpness before being displayed. Once it is displayed, further processing may be carried out to transform the resulting image into a rectangular shape, reduce vignetting, correct any color imbalance, and sharpen it. In one embodiment, the operator can then be permitted to save the image (e.g. a representation of a document). These features are further described below.

An indicative feature detection process, in various embodiments, may use one or more of a variety of algorithms for detecting document indicative features. One illustrative algorithm embodiment may involve scanning along horizontal lines 311 and vertical lines 313 through the thumbnail and find those that contain exactly two significant pixel transitions, as indicated above with reference to FIG. 4. Another illustrative algorithm embodiment may involve finding the first significant pixel transition in each direction, starting from the centers of each of the four edges and working towards the center of the thumbnail. A pixel transition pair, rising above a pixel transition threshold, can be regarded as significant in absolute terms in various illustrative embodiments, such as if the sum of the absolute difference between the three color values of a pixel and those of its neighbor is greater than a specified value.

For example, each pixel may encode 24 bits of color data in an R8G8B8 format, such that each of the red, green, and blue intensity of each pixel may range from 0 to 255, and a threshold may be set of a difference of at least 64 in each of the three color components, as an illustrative example, or of at least 128 in each of the three color components, as another illustrative example. Other intensity thresholds for each color component, either lower, higher, or within this range, may also be used for pixel transition thresholds in other illustrative embodiments. In another illustrative embodiment, color component intensities may be multiplied and differences between the products of the color components in adjacent pixels may be evaluated for significant pixel transitions. In other illustrative embodiments, a pixel transition pair can be regarded as significant in relative terms, such as by selecting the two pixel transition pairs with the greatest differences along each axis or scan line. In various embodiments, an evaluation that combines absolute and relative criteria may be used. In various embodiments, both of the two algorithms described here may be utilized with several different transition values to see which one gives the best end result. After each attempt at finding indicative features, the indicative feature detection process can carry on to see how far it gets. In case of any check failing, the next transition value and/or edge detection algorithm will be tried. The process can continue until either a fully satisfactory result has been obtained, or when both algorithms have been used with all applicable transition values.

In practice, there may be different numbers of scan lines that find no edge even though there is an edge, lines that find an "edge" even though there is no actual edge, and also lines that find both a horizontal and vertical edge.

As light and other conditions vary along each edge of a document being imaged, an indicative feature detection process may work better on some parts of a target document than others. It may therefore not be uncommon to find that an edge has been broken up into several segments, each one of which contains consecutive or aligned pixel transition points. A list of edge segments may be built up by comparing the first and second pixel transition pairs of each horizontal and vertical line that have them with the ones from the previous scan line (if any) to see if they are roughly similar and are moving in the same direction. If they are, then the points can be added to the current edge segment, otherwise a new segment is started. Given margins of error may be accounted for, such as allowing a single outlier in each segment, for example, so as not to break up an edge segment that contains a single misidentified value. At the end of this process, segments with less than a specified minimum number of points may be discarded, leaving four sets of segments that should include each of the four edges.

In an illustrative embodiment, a least squares method may be used to fit a straight line equation to each segment in each of the four sets. Each set may then be examined individually, and the segments may be tested in pairs to see if they might belong to the same edge. To do this, their two equations can be used to obtain a measure of the difference between the two lines by summing the squares of the distance between the lines at a number of places over a range corresponding to the width or height of the thumbnail as appropriate. If such measure is less than a specified value, the segments can be merged. At the end of this process, merged segments with less than a specified minimum number of points can be discarded, and the largest remaining merged segment in each set (if any) is selected—this will eliminate segments that, for example, corresponded to a vertical edge when a horizontal edge was being looked for. A least squares method may be used again to fit straight lines to the four segments.

FIG. 5 shows a possible result from a single line of at least approximately aligned edge segments 431 (each one shown as a thick line segment) produced from the scan lines depicted in FIG. 4, together grouped and extended as representing merged segment line 433. Each of edge segments 431 may be assembled from adjacent or consecutive sets of vertical pixel transition pairs 323 that may be generated from vertical scan lines 313 across thumbnail 301. Edge segment 435 may also have been assembled from consecutive sets of vertical pixel transition pairs 323 generated from vertical scan lines 313, but in this illustrative embodiment, edge segments generated by one particular orientation of scan lines may be used to populate one orientation of edge segments groups, as an error constraining technique. The at least roughly aligned edge segments 431 may be merged, while the unaligned edge segment 435 may be discarded because it was not aligned with the other vertical-scan-generated segments, and it was data-poor in terms of number of pixel transition pairs detected in the vertical scans than the merged segments 431 (since it is closer to vertical and has more of a parallel component to the vertical scan lines and a lower vertical scan resolution, while the merged segments 431 are closer to horizontal and each have more of a perpendicular component to the vertical scan lines and a higher vertical scan resolution). Similarly, horizontal scans may be taken to detect only the segment groups that are closer to vertical and are read with higher resolution in the horizontal scans than the vertical, and similarly would be detected to be strongly out of alignment with the orthogonal segments.

Individual segments may contain inaccuracies, but merging the segments tends to produce a more accurate combined result, as illustratively shown in merged segment line 433 in FIG. 5. In other illustrative embodiments, information from vertical and horizontal scans may be used to detect and characterize any edge segments forming parts of any of the four edges of a target document.

Sufficient processing for detecting, characterizing, and merging pixel transition pairs and/or edge segments may produce four merged segment lines 433, 437, 443, 447, and edge equations may be determined to characterize each of the four merged segment lines. Having obtained the four edge equations, the edge equations may then be examined in pairs to check that their relative angles are at least close, such as within a desired margin, of 90°, in various embodiments. The check may be approximate, and the angles may be recalculated more accurately later on, in various embodiments. The purpose of this is to ensure that the edge building process has resulted in an image portion that could represent the edges of a 2D rectangular form, as imaged in a 3D space. If the check is successful, the equations may be solved in pairs as simultaneous equations to give the four corner points 451, 453, 455, 457 defined by the four intersections of each of the four pairs of intersecting merged segment lines 433, 437, 443, 447, as depicted in FIG. 6.

The validity of these corner solutions may then be tested to a high degree of accuracy. The corners were derived from a 2-dimensional image of what should be a 2-dimensional document, but the document exists in 3-dimensional space (3-space for short) and could have been rotated along the x, y or z axes. A certain amount of rotation along the z axis is not a problem as it does not affect the overall geometry of the shape, it just reduces the maximum possible document image size. However, any x and/or y axis rotation changes the camera's line of sight toward the target document to a skewed perspective view, and changes the camera's view of the rectangle into a non-rectangular quadrilateral with potentially four different side lengths and corner angles. The 2-space corner angle check could be made stricter, or the aspect ratio of the sides calculated at this point, but doing this limits the amount of skew that can be tolerated, and could also let through invalid corner solutions, in various illustrative embodiments.

Figure 7:
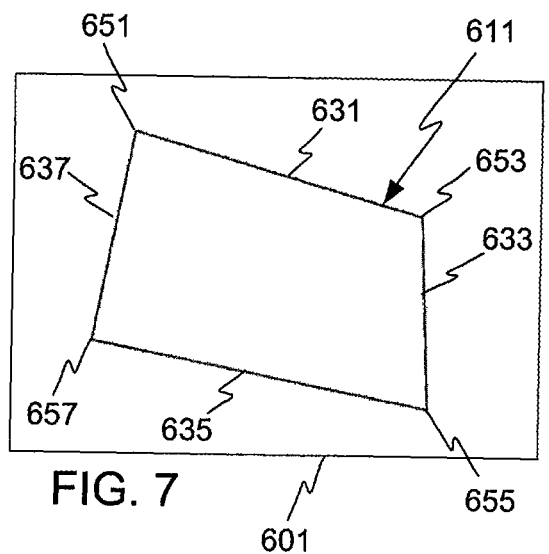
Figure 8:
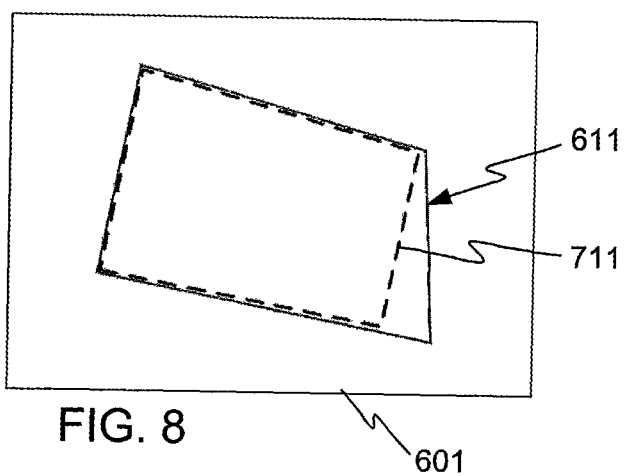

FIGS. 7 and 8 depict aspects of imaging such a skewed perspective quadrilateral and interpreting a representation of a rectangular document from it. FIG. 7 depicts an illustrative example of this skewed perspective view quadrilateral 611 of an imaged document in an image frame 601, where quadrilateral 611 is defined by four edges 631, 633, 635, 637 and four corner points 651, 653, 655, 657 identified through feature detection processes as described above. Quadrilateral 611 could represent a rectangle that is being viewed from below and slightly to the left of its center, but it is also possible that it could represent an invalid corner solution for a different rectangle, as shown by the invalid solution line border 711 in FIG. 8. If very tight validation were to be applied to the 2-space angles and side lengths, then the scope of interpreting a skewed image would be too tightly constrained, and the quadrilateral 611 would be rejected as being too different from being rectangular.

A process for identifying a rectangular document therefore may allow for a significant deviation of the angle of each of the four corners of a candidate quadrilateral from 90 degrees, and/or a significant deviation of the length of each pair of opposing sides of the quadrilateral from being equal, though still disqualifying candidate quadrilaterals with overly broad deviations in their angles from 90 degrees or in the length of their opposing pairs of sides. Exactly how significant these deviations are allowed without disqualification may be different in different embodiments, and may be tunable within a single embodiment, for example.

To determine whether or not the 2-space corners could represent a flat rectangle of the required size and shape in 3-space, the corner coordinates can be converted from 2-space to 3-space before doing any further validation, in an illustrative embodiment. In the general case the problem is underconstrained and there can be an infinite number of solutions, which would comprise all of the possible intersections between any plane and the infinite 4-sided pyramid defined by an apex at the camera and whose four edges each pass through the apex and each of the four identified corner points 651, 653, 655, 657. In one illustrative embodiment, this conversion may be performed using non-linear programming techniques, using various assumptions. In this example the following three assumptions can be made:

1. The 3-space coordinates really do represent a rectangle, and therefore each 3-space corner angle is 90°.
2. The center of the rectangle is at a fixed position. This means that instead of four free variables (the z coordinates of each corner), a lower number may be need such as only three or only two are needed, and the remaining one or two can be calculated, for example. Together with the first assumption, this prevents there being infinitely many solutions and also prevents the degenerate solution of all z coordinates being zero.
3. The z coordinates of the corners are similar—in other words, the rectangle is not excessively skewed relative to the camera. This assumption provides for a set of reasonable starting values for the non-linear solver so that it finds the solution more quickly, in this illustrative embodiment. The distance of the rectangle to the camera may be estimated from its apparent size and used as the initial z coordinate for each corner.

Using the first assumption, an equation may be constructed whose variables are the 3-space z coordinates of the three free corners and whose result represents how far the four corner angles are from being 90°, and using the other two assumptions this equation can be solved (in the sense of minimizing the angle errors) using non-linear programming, in this illustrative embodiment. An example of an equation for this illustrative embodiment may be constructed as follows, using conventional algebraic notation, and with points in 3-space denoted by a single Roman letter, points in 2-space by a single bold italic letter, lines as a pair of letters showing the end points of the line, and angles as a single letter with a circumflex (^).

First, in this illustrative embodiment, the 2-space x and y coordinates of the corners are converted to 3-space using a simple perspective transformation based on the assumed z coordinate of each point:

$A_x = sA_xA_z$ $A_y = sA_yA_z$
$B_x = sB_xB_z$ $B_y = sB_yB_z$
$C_x = sC_xC_z$ $C_y = sC_yC_z$
$D_x = sD_xD_z$ $D_y = sD_yD_z$ where s is a scaling factor derived from comparing the size of the 2-space quadrilateral to the angular field of view of the camera. In the case of having only three free variables, the z coordinates of points B, C and D can vary freely during the solution process, but the z coordinate of point A is constrained by the second assumption above, and will always be equal to $4R_z - B_z - C_z - D_z$ where $R_z$ is the estimated distance of the center of the rectangle from the camera. Then the squares of the lengths of each side and each diagonal may be calculated as follows:

$$S_{AB} = (A_x - B_x)^2 + (A_y - B_y)^2 + (A_z - B_z)^2$$

$$S_{BC} = (B_x - C_x)^2 + (B_y - C_y)^2 + (B_z - C_z)^2$$

$$S_{CD} = (C_x - D_x)^2 + (C_y - D_y)^2 + (C_z - D_z)^2$$

$$S_{DA} = (D_x - A_x)^2 + (D_y - A_y)^2 + (D_z - A_z)^2$$

$$S_{AC} = (A_x - C_x)^2 + (A_y - C_y)^2 + (A_z - C_z)^2$$

$$S_{BD} = (B_x - D_x)^2 + (B_y - D_y)^2 + (B_z - D_z)^2$$

Now, error values that will decrease as the 4 corner angles become closer to 90° may be derived:

$$A_\epsilon = S_{DA} + S_{AB} - S_{BD}$$

$$B_\epsilon = S_{AB} + S_{BC} - S_{AC}$$

$$C_\epsilon = S_{BC} + S_{CD} - S_{BD}$$

$$D_\epsilon = S_{CD} + S_{DA} - S_{AC}$$

If any angle is 90° then by Pythagoras' theorem, the corresponding error value will be zero. However, if the angle is not 90° then the cosine rule states that the error value, for example, for corner A will be equal to:

$$A_\epsilon = 2 \cdot DA \cdot AB \cdot \cos \hat{A}$$

which will tend to zero as $\hat{A}$ tends to 90°. The error value will also tend to zero as DA and AB tend to zero, which will in turn tend to zero as their corresponding z coordinates tend to zero. However, because of the constraints applied to the corners, such as because of the way $A_z$ is defined in the current example, it can never be zero at the same time as the other z coordinates, in this example. This prevents the degenerate solution $A_z = B_z = C_z = D_z = 0$.

Finally, the four error values may be combined into a single value that the solver can seek to minimize. A method that will prevent a positive error from canceling out a negative error is needed, so the squares of the individual errors are summed:

$$\text{Total}_\epsilon = A_\epsilon^2 + B_\epsilon^2 + C_\epsilon^2 + D_\epsilon^2$$

Although it would be slightly faster to sum the absolute values of the errors rather than their squares, doing so would introduce discontinuities into the equation's surface that could reduce the accuracy of the solution, in this illustrative embodiment.

The solution method used in the illustrative example above is an iterative one that seeks to minimize the result of the above equation by repeatedly changing the three free variables by a small delta value and seeing whether these changes improve the result or not. For each iteration, it can calculate the total error, in one embodiment, up to 27 times—this is because it will use each of the free variables as they are, with the delta added, and with the delta subtracted (it may make less than 27 calculations because it will not repeat ones that had already been made in the previous iteration). If a given set of changes does not improve the result, system 5000 can determine that a current result must be close to a local minimum and can therefore reduce the delta for the next iteration. When either the delta reaches a specified minimum value or the number of iterations has reached a specified limit before the minimum delta value was reached, the solution process can terminate. This typically happens quickly because the equation's surface is continuous and relatively smooth, in this illustrative example.

The validity of the original corner solution can then be determined by two simple checks on the 3-space corners, in this illustrative embodiment. First, the 3-space angles may be checked to be sufficiently close to 90°, and then the aspect ratio of the rectangle's sides may be checked to be sufficiently close to the expected value. These tests can be much stricter than corresponding checks on the 2-space quadrilateral. For example, in an illustrative implementation, the 3-space angles may be checked to be in the range 90°±0.25°, and the aspect ratio to be within 2% of the expected value. The tests could be made even stricter, but then a document that was not relatively close to perfectly flat could be rejected, in this illustrative implementation. If both tests are satisfied then processing can continue, in this example.

Various embodiments of an edge detection process may therefore include measuring angles between identified linear features, evaluating whether the measured angles are within a constrained skew value around 90 degrees, and if they are, then identifying intersections of the linear features as identified corner points. A skew value may be considered to be equivalent to an angle error or an error value in the angles, indicating skew effects in the 3D imaging of a 2D 90 degree angle, in various illustrative embodiments.

Smoothing of Results: The result values returned by the document detection process in this illustrative embodiment are the 2-D corner locations within the original image, the 3-D document distance, offset from the camera axis and angles of rotation, the difference in aspect ratio from the expected value, and the shadow amount. Because a small change in a single edge solution could make a significant difference to the final 3-space solution, these results may be smoothed over a specified time period by calculating moving averages, in this illustrative embodiment. If the values suddenly change by more than a specified amount then the new results may be temporarily ignored and the previous ones returned, unless all four corners have changed—in this case, the moving averages may be reset because it may be assumed, in this illustrative embodiment, that the camera (or the document) was moved quickly to a new position.

Image Shadow Check: Additional checks of image quality may also be performed, such as an image shadow check and a camera movement check. A shadow across the document can severely impact its readability, so the image may also be checked for excessive shadow. A shadow detection may for example be carried out by summing thumbnail pixel color values in groups, sorting the resulting list of values in ascending order from darkest group to lightest, forming a histogram approximately representing the original image brightness values, and examining percentile values in the histogram, which may support a reliable analysis between shadows and contrasting features intrinsic to a document, in this illustrative embodiment.

Figure 10:
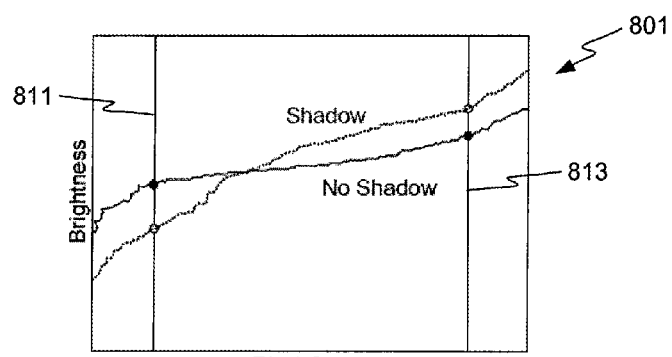
FIG. 10 depicts a chart regarding aspects of processing image frames, in accordance with an illustrative embodiment.

For example, shadow detection may be carried out by summing the thumbnail pixel color values in 10×10 groups, in an illustrative embodiment. The resulting list of values may then be sorted in ascending order so that the darkest group is first and the lightest group last, forming a histogram approximately representing the original image brightness values. The 10th and 90th percentile values can then be examined. This is because images with shadow will typically exhibit a significantly greater difference between the lowest and highest values than an image with no shadow, but extremes at both ends may need to be ignored, in this illustrative embodiment. FIG. 10 illustrates this point with chart 801 which shows values obtained from the same illustrative target document both in shadow and not in shadow. In chart 801, line 811 represents approximately the 10th percentile, line 813 represents approximately the 90th percentile, and the points marked show the higher ratio of values for the shadowed image. In this illustrative embodiment, the shadow percentage may be calculated as:

$$100-(10th \text{ percentile value} \times 100)/(90th \text{ percentile value})$$

This value may then be checked to be less than the maximum value in the document profile. The maximum value may need to be set according to the document type because a document with large areas of different colors and/or shades will appear to this method to have a greater shadow percentage than a more uniform document under the same lighting conditions. If the shadow check fails, a graphical operator hint icon may be displayed on the device's screen to inform the operator, in this illustrative embodiment.

Camera Movement Check: Additional checks of image quality may also be performed, such as a camera movement check. This check may be performed to prevent the user from attempting to capture a still image when mobile device 1000 is known to be in motion, in an illustrative embodiment. A camera motion check may be performed to prevent the user from attempting to capture a still image when mobile device 1000 is known to be in motion, in an illustrative embodiment. The motion check may, for example, compare groups of pixel blocks from a current preview image to the previous one, and taking a change in any of the total red, green or blue values of the pixel groups have changed by more than a specified amount as an indication of excessive camera motion, in an illustrative embodiment. Various steps may be taken to prevent factors such as shadow or camera motion from interfering with document image capture, including automated steps and/or operator hints. The motion check may, for example, compare 64 groups of 4×4 pixels from the current preview image to the previous one. If any of the total red, green or blue values of the pixel groups have changed by more than a specified amount, then an icon may be shown on the display 1222.

Figure 17:
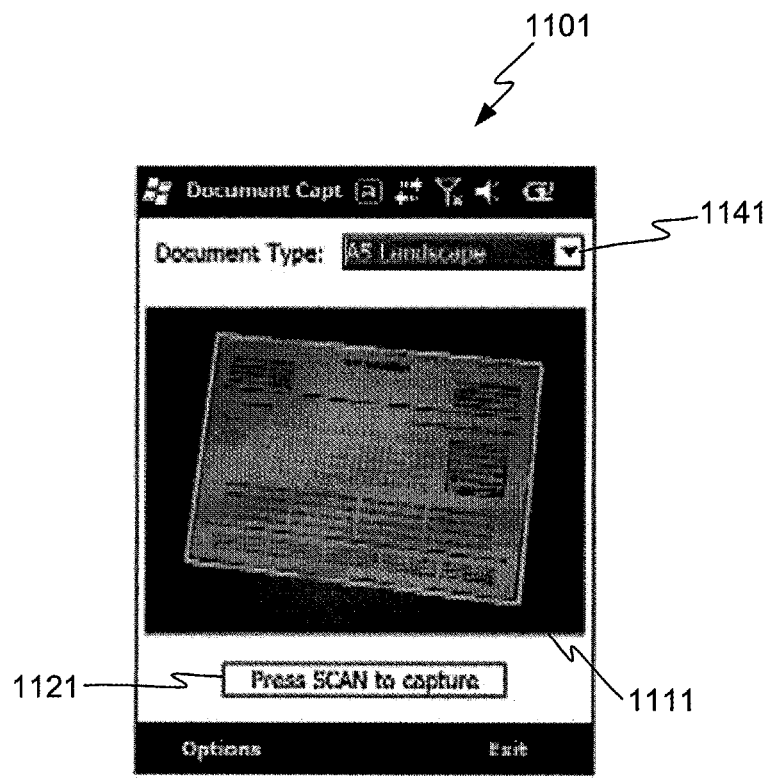
FIGS. 17 and 18 depict graphical user interface application windows, in accordance with various illustrative embodiments.
Figure 18:
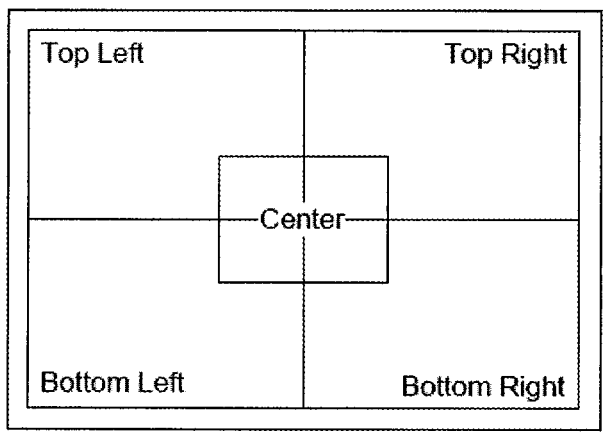

In various illustrative embodiments, system 5000 may be operative so that a preview window with a streaming preview image may be shown on the display of a digital device, as depicted in FIGS. 1, 17, and 18. System 5000 may be operative so that mobile device 1000 can display a streaming preview image 1111 on display 1222, where the streaming preview image 1111 shows a low-resolution real-time preview of what the camera is seeing. The preview image 1111 may serve a variety of useful purposes in promoting successful document capture. For example, an illustrative document capture processing implementation may recognize a number of different standard and/or non-standard document profile types, with associated document aspect ratios and sizes. The preview window 1101 may show an indication of a particular document profile type.

Figure 11:
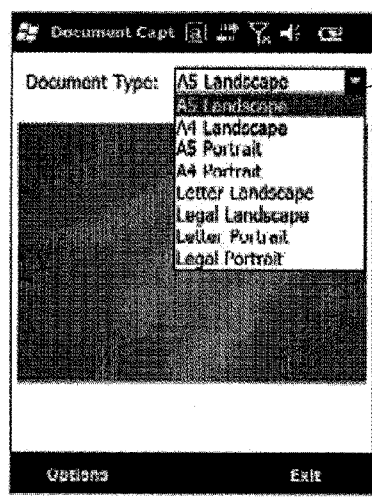
FIG. 11 depicts a view of aspects of processing image frames, in accordance with an illustrative embodiment.

An illustrative document capture processing implementation may pre-select a document profile type, for example. In another illustrative implementation, a document profile type may be displayed at the top of the screen, and if it is not the one required, then a document profile type drop-down menu 1141 may be opened and one of several available profiles listed on the menu may be selected, as depicted in FIG. 11. The listed menu options may combine document profile types and orientations, such as A5 landscape, A4 landscape, A5 portrait, A4 portrait, and so forth, as shown in FIG. 11. Different profiles may be stored for various standard document types, which may each have a profile with associated parameters such as aspect ratio, edge lengths, target color balance, etc. Standard parameters such as these may be used in conjunction with a set of fixed parameters to control the process.

For example, system 5000 may also be operative so that profiles may be selected via the keyboard 1226 by pressing the enter key 1228 of keyboard 1226 to open document profile type drop-down menu 1141, using the Down Arrow and/or Up Arrow keys to highlight the required profile, and then pressing the enter key 1228 again to select it. New profiles or combinations of profiles with orientation can also easily be added or existing ones modified, in this illustrative embodiment. Additional information on image profiles is provided in the Configuration File section below.

Operator Hints: With the correct profile selected, an operator can aim imaging subsystem 400 or camera of mobile device 1000 at the document 110. At this point, if a candidate document solution has passed all of the tests then it may be indicated that it probably does represent a valid document, in this illustrative embodiment. However, in an illustrative embodiment, system 5000 can be operative so that a final set of checks may be made before the still image capture and saving (e.g. capture and saving of a representation of a document) is permitted. In this illustrative embodiment, these checks ensure that the document satisfies certain criteria for quality imaging, such as that the document does not extend beyond the terminal's or camera's field of view as can be defined by lens assembly 250 in combination with image sensory array 1033, that the document is taking up a certain minimum amount of the field of view, and that the document is not so skewed so that there could be depth of field issues or image degradation during the image transformation process. Various aspects of operator hints are depicted and discussed with reference to one or more of FIGS. 12-17.

System 5000 may be operative so that the preview window can provide operator hints, or guidance indications, that may be in the form of graphical operator hint icons and/or other user-perceptible indications, graphical or otherwise, to provide operating guidance to the user in positioning mobile device 1000 and/or document 110 to improve the imaging quality for capturing a high-resolution image of document 110. A variety of operator hint icons may be used to guide the user to take many types of actions to improve imaging quality for document capture. In various embodiments, operator hints may take any user-perceptible form, illustratively including sounds or audio outputs, tactile outputs, or any type of graphical or other visual outputs, and may include any combination of outputs.

System 5000 may be operative so that the preview window can show one of three things with imaging subsystem 400 pointed at document 110: the document (i.e. a representation thereof) with no border, the document with a red border, or the document with a green border, to indicate different statuses, in an illustrative embodiment. In this example implementation, system 5000 may be operative so that if the whole document is visible and has no border, the program was not able to detect the presence of the document. This could be because the document is too far away, the lighting conditions are poor (for example, the document is partly in strong sunlight), the background is "distracting" the recognition process, or part of the document extends outside the field of vision of the camera, for example.

Figure 12:
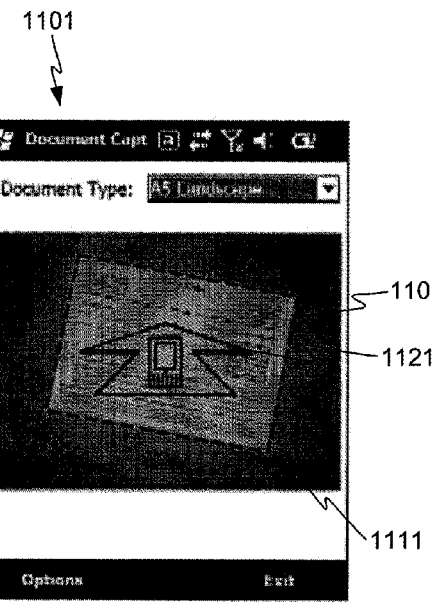
FIG. 12 depicts a graphical user interface application window, in accordance with various illustrative embodiments.

System 5000 in this illustrative embodiment may be operative so that if any of these checks fail, an operator hint icon may be rendered on display 1222 showing the operator how to move the terminal to resolve imaging quality criteria failures. FIG. 12 depicts an illustrative example of an operator hint icon 1121 rendered in a preview image 1111 within an application window 1101, as an illustrative example of an operator hint icon. Failures in the quality imaging criteria may be aggregated over a specified time period so that the operator is not presented with rapidly-changing instructions.

A user may be prompted, with operator hint icons, for example, to ensure that the lighting across the document is reasonably even, to try moving closer to the document, or to place the document against a more uniform background, for example. System 5000 may be operative so that once the document is detected it will be shown with a superimposed border. For example, a red border may indicate that the document has been detected, but the image that would be produced is not optimal for one of several reasons. In this case, an operator hint icon may be displayed on the screen as a visual instruction as to how to improve the image, for example, the screenshot below on the left is telling the operator to move the terminal closer to the document. System 5000 can be operative so that if the instructions are followed then the border can turn green, indicating that the scan key 1228 may be pressed to capture the document. The document does not have to be perfectly lined up or centered for the border to turn green because the final captured image will be automatically cropped/scaled/rotated as needed, in this illustrative embodiment. This is depicted in FIG. 17.

Figure 13:
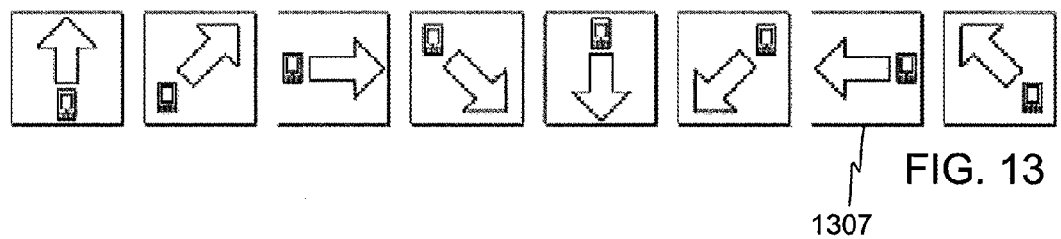
FIGS. 13-16 depict graphical user interface application icons, in accordance with various illustrative embodiments.
Figure 14:
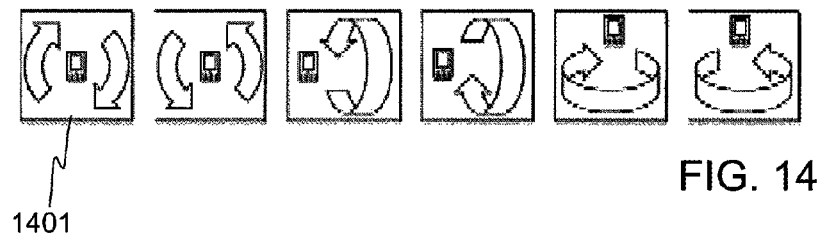
Figure 15:
Figure 16:
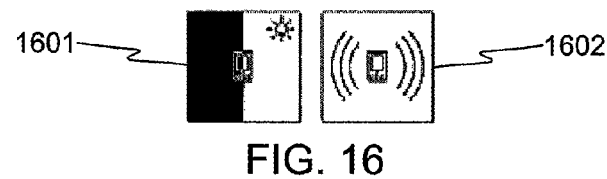

System 5000 can be operative so that the color of an icon displayed when a red border is present will cycle so as to be visible against both light and dark backgrounds, and it may also be animated. It may include any of the icons depicted in FIGS. 13-16, in which each of the icons serves as a user hint icon. FIG. 13 depicts straight indicator icons to prompt a user to translationally move mobile device 1000 in any one of eight indicated directions. As shown in FIG. 13, these straight indicators may be selected from arrows with any of eight different orientations, consisting of: upward, diagonally upward and leftward, leftward, diagonally downward and leftward, downward, diagonally downward and rightward, rightward, and diagonally upward and rightward. These are merely illustrative examples, and hint icons may be provided that point in any direction, and in exactly the direction the mobile device 1000 should be moved. The graphical format of the hint icons may also take any of a wide variety of forms; another illustrative example is an animated image of the mobile device 1000 moving in the desired direction. FIG. 14 depicts user hint icons to prompt a user to rotate mobile device 1000 in an indicated direction. The icons of FIG. 14 constitute curved indicators displayed on the monitor indicating a direction to rotate the device. FIG. 15 depicts user hint icons to prompt a user to move mobile device 1000 closer to or further away from the target document. The icons of FIG. 15 serve as distance indicators displayed on the monitor indicating a direction for re-positioning of the device closer to or farther from a target. FIG. 16 depicts user hint icon 1601 to indicate that the document is partly in shadow, and should be moved to where the illumination is more even. Icon 1601 serves as a partial shadow indicator displayed on the monitor indicating that an apparent partial shadow is obscuring a candidate quadrilateral form. FIG. 16 also depicts user hint icon 1602 to indicate that the image of the document is unclear because of motion of the camera. Icon 1602 serves as an excessive motion indicator displayed on the monitor indicating that at least one of the imaging system and/or a candidate quadrilateral form are exhibiting excessive motion interfering with the capability for identifying linear features defining the candidate quadrilateral form. System 5000 can be operative so that user hint icon 1602 is used only after the scan key 1227 has been pressed to capture a document image and indicates that the image was not sharp enough, so the terminal should be held more steadily and the capture attempted again.

As an illustrative example, if the document is very close to the left hand edge of the field of view and the top left corner goes out of view, then a curved indicator user hint icon 1401, as in FIG. 14, telling the operator to rotate the device clockwise may be shown. However, if shortly after this the bottom left corner goes out of view, then instead of a user hint icon telling the operator to rotate the device anticlockwise being shown, a straight indicator user hint icon 1307 as in FIG. 13 telling them to move the device to the left may be shown instead, in this illustrative embodiment.

In one illustrative embodiment, system 5000 need not be operative to display scan button 1227, and instead can be operative so that a higher quality higher resolution still image of a document is saved responsively to the determination that a lower resolution frame corresponding to the higher resolution frame (normally buffered) is of acceptable quality, without processing also being responsive to actuation of scan button 1227. Where system 5000 is operative so that a higher resolution frame corresponding to lower resolution frame processed for determining frame quality has been buffered, the buffered higher resolution frame can be saved or can be processed for saving of an image responsively to activation of button 1227, the icon indicating mobile device 1000 should be held more steadily may not be displayed (a present hand motion cannot effect motion of a prior captured frame). System 5000 can be operative so that there are two other icons that can appear on this screen—when the flash is on, a small "light bulb" icon may be shown near the bottom left of the screen, and when diagnostics are being written, as further described in the Configuration File section below, a small "spanner" icon may be shown near the bottom right of the screen, in this illustrative embodiment.

System 5000 in this illustrative embodiment may be operative so that once all imaging quality criteria are satisfied, the operator can be prompted to capture and save a still image (e.g. a representation of a document, which representation can be included in a frame of image data). In one embodiment, system 5000 can be operative so that when the imaging quality checks are satisfied, mobile device 1000 may automatically image and save a high resolution copy of document 110, or prompt a user to enter an input to image and save a high resolution copy of document 110, such as by activating scan button 1227 on mobile device 1000, as in FIG. 17.

System 5000 can be operative so that when scan button 1227 is activated, actuation of the scan button 1227 results in a frame or image captured subsequent to the button actuation being saved or processed for saving. In various illustrative embodiments, a frame of image data captured and subject to processing for saving may have a higher resolution than a frame subject to processing for quality detection (e.g., can have a resolution of e.g., 1600×1200 or 1280×1024). System 5000 can also be operative so that when scan button 1227 is actuated, a buffered higher resolution frame, as described herein, corresponding to the lower resolution frame subject to processing for quality detection is saved or is processed for saving of an image of a feature, e.g. a document. The buffered higher resolution frame can have a resolution equal to the resolution of image sensor array or another relatively higher resolution, e.g. 1600×1200 or 1280×1024, in various illustrative embodiments. The saving of a frame or of an image e.g. a document representation can comprise writing the frame into a long term storage memory, e.g. memory 1084, which may be e.g. a flash memory or a hard drive, in various illustrative embodiments.

System 5000 may also be operative so that saving of frame or image (e.g. a document representation) may occur without actuation of scan button 1227 responsively to a described quality check being completed with a determination of acceptable quality and without also being responsive to an actuation of scan button 1227. Image data processed for saving can be image data of a frame captured subsequent to the quality check being complete or prior to completion of a quality check (as in the case of a buffered frame corresponding to the frame processed for quality check being processed for saving), in various illustrative embodiments.

Pre-Save Processing: This is the final processing which can be carried out before the document image can be saved in this illustrative embodiment, and can consist of either one or two stages in various illustrative embodiments. The first stage can comprise three or four separate functions carried out the same time, in an illustrative embodiment. First, this processing stage may include extracting the document image from the captured picture, and transforming it using 2×2 bilinear interpolation so that it is rectangular and perpendicular. Second, this processing stage may include reducing vignetting caused by the camera lens and the illumination subsystem 800. Third, this processing stage may include correcting the image brightness and color balance using the information gathered in the previous step so that it conforms to a target value held in the image profile. Fourth, if a grayscale image was requested, the pixel color values may each be set to the average of the individual color values. The second processing stage may be controlled by a flag in the document profile, and may optionally sharpen the image using a convolution filter, in this illustrative embodiment.

Color balance correction may be performed via color space conversion from RGB to HSV or some other similar color space and back again, in an illustrative embodiment. However, such processing may take more time than is desired in some applications or contexts, so a less computationally intensive (but therefore less accurate) method may be employed in another illustrative embodiment. Either of two simplistic methods may be used in different illustrative implementations, one of which involves adding the difference between the average source value and target values to each pixel, and the other of which involves dividing each pixel by the average source value and multiplying it by the target value. The first method may work better when the difference is large, but may not preserve image contrast well. The second method may preserve image contrast better, but may only work well when the difference is small. Various illustrative implementations may use an average of the results of both methods, weighted in proportion to the size of the difference in values for each color, which may work reasonably well in correcting color temperature differences in a variety of illustrative embodiments.

Image Sharpness Check: When a still image has been selected for capture and before the screen-sized version of it is displayed, it can be checked for sharpness, in an illustrative embodiment. It may be very difficult to see how sharp the image is by just looking at the preview screen-sized version, and this image sharpness check may compensate for that. The sharpness check may illustratively sample a random set of adjacent pairs of pixels and return the average value of the absolute differences in pixel color values expressed as a percentage of the average total of the pixel color values. This works because blurred images have smaller changes in brightness from one pixel to the next compared with sharp images.

In this illustrative embodiment, the sharpness check may be performed separately on, for example, five different parts of the image—each quadrant plus the central section—ignoring the outermost region in case the image went beyond the document edges, as depicted in FIG. 18. Such processing provides various advantages. First, the effects of motion blur could differ across the document if the camera was being rotated when the still image was captured. Second, a document may have differing levels of detail in different sections. For example, if a particular quadrant of the document is mainly white then it will always score badly on the sharpness test. In case, the minimum sharpness value can be reduced for that quadrant, or the test can be skipped completely by setting that quadrant's sharpness value in the document profile to zero.

Figure 9:
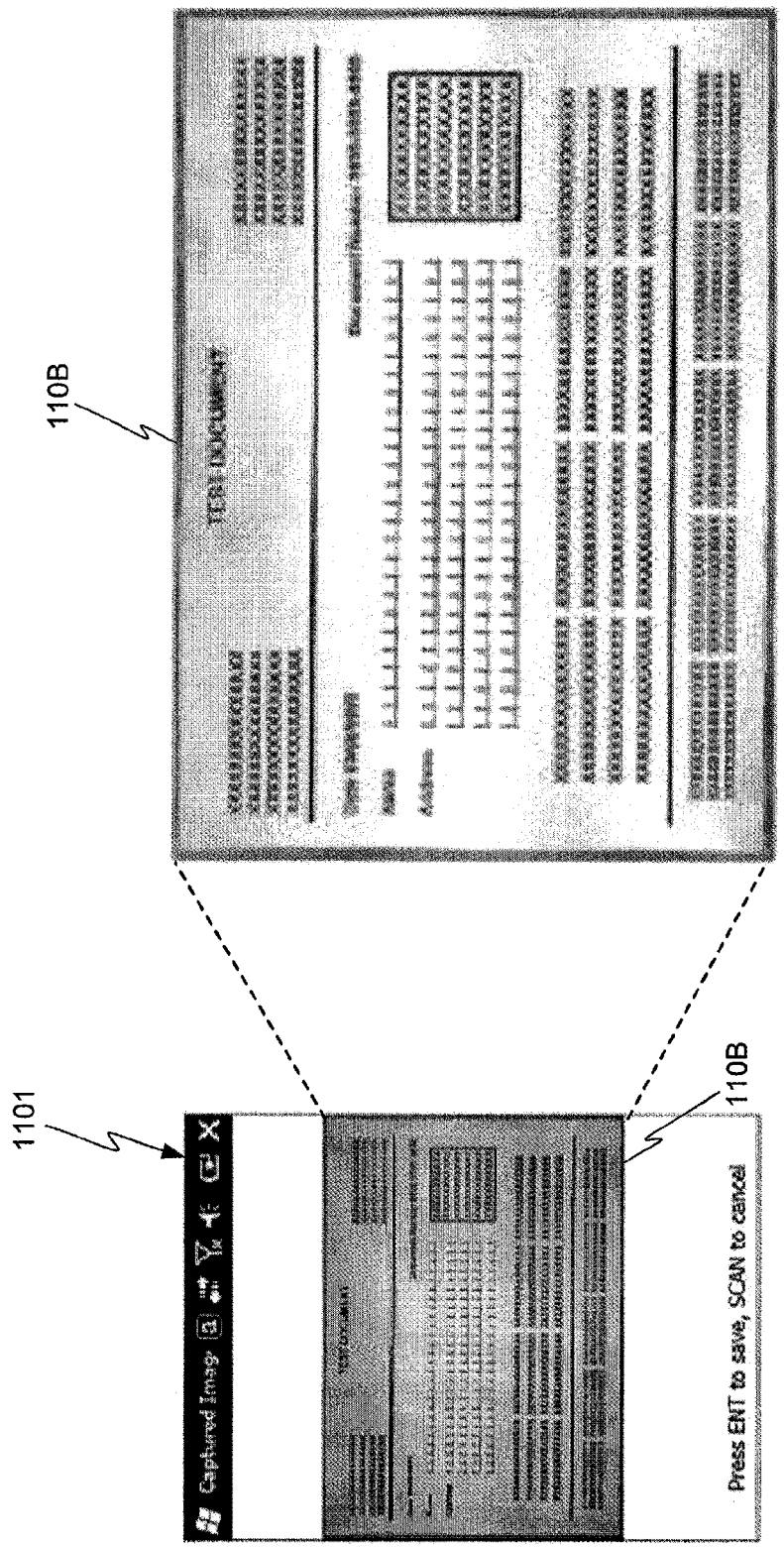
FIG. 9 depicts a graphical user interface application window with a graphical rendering of a document captured from an image signal, in accordance with an illustrative embodiment.

In an illustrative embodiment, once a sufficiently sharp still picture has been captured, a screen-sized image of the document may be extracted from it and transformed so that it is rectangular and perpendicular. For example, FIG. 1 shows preview image 1211 with candidate document 110 as it may be captured by a document capture process; and FIG. 9 shows candidate document 110 as it has been extracted from the preview image 1211 and transformed so that it is rectangular and perpendicular, and transformed, rectangular and perpendicular candidate document 110B displayed by itself. During this process, color information may be gathered that will be used to correct the image during the pre-save processing. The image can be displayed on display 1222, and may be followed by final pre-save processing steps before the document image can be saved, in this illustrative embodiment. This final pre-save processing may illustratively involve any or all of the steps of extracting the document image from the captured picture, transforming it using 2×2 bilinear interpolation so that it is rectangular and perpendicular, reducing vignetting caused by the camera lens and the LED flash, correcting the image brightness and color balance using the information gathered in the previous step so that it conforms to a target value held in the image profile, converting the image to grayscale, sharpening the image such as with a 3×3 convolution filter, and/or correcting color balance, in various illustrative embodiments.

Image File Save: Once the pre-save processing is complete, the operator may in various illustrative embodiments be prompted or permitted to save the document image, e.g. by pressing the enter key 1228. System 5000 may also be operative so that saving of a document image occurs responsively to the described pre-save processing being complete without entry of enter key 1228, i.e. without the saving further being responsive to actuation or enter Key 1228, in other illustrative embodiments. Saving may be performed using the Imaging-Factory component from Microsoft Corporation, as an illustrative example. Saving an image may comprise writing the image to a storage memory 1084, which may be e.g. a flash memory or a hard drive in a selected image file format, in various illustrative embodiments.

System 5000 can be operative so that once a document image has been successfully captured, a preview of the captured document can be displayed. System 5000 can be operative so that the preview can be shown using the maximum amount of the available screen area, so taller documents will be shown with a white left and right border, and wider documents will be shown with a white top and bottom border. This is illustratively depicted in FIG. 9.

System 5000 can be operative so that a few seconds later, a prompt can appear below the image as shown above. System 5000 can be operative so that pressing the enter button 1228 will save the document to \IPSM\Document Capture with file name DocYYYYMMDDHHMMSS.ext, where ext represents the selected file type, selected from among jpg, png or bmp file type, in an illustrative embodiment. In one embodiment, system 5000 can be operative so that if the scan button 1227 is pressed instead, the document will not be saved. In both cases, the preview window will then be shown again so that another capture may be performed if required. The saved image will be corrected for optical effects such as vignetting and color balance, so will typically be of a higher quality than the preview. This is illustratively depicted in FIG. 9.

To exit from the program, a user may tap on an exit button in the menu bar or press the right menu button when the preview window is being displayed, in an illustrative embodiment.

In one illustrative embodiment, system 5000 can be operative so that system 5000 may be configured via menu selections and also by an XML based configuration file.

System 5000 can be operative so that the following menu selections, each of which can have a corresponding active button displayed on display 1222 are available by tapping on Options in a menu bar displayed on display 1222 or by pressing a designated Menu button of keyboard 1226. System 5000 can be operative so that any of the below referenced menu options can be made active by selection of a displayed menu option displayed on display 1222.

Flash Flash state during the capture process, either "Off", "Automatic" or "On". This menu option is initialized when a document profile is selected, but may be changed afterwards.

File Type Format in which the document image will be saved, either "JPEG Low quality", "JPEG Medium quality", "JPEG High quality", "PNG" or "BMP". This menu option is initialized when a document profile is selected, but may be changed afterwards.

Smart Focus If this option is enabled, the lens focus will be set according to the estimated distance from the terminal 1000 to the document. If the option is disabled, the camera will use autofocus mode instead. Auto focus should normally be left enabled as it will reduce the time taken to capture the image.

Write Diagnostics If this option is enabled, the program will write a diagnostics file containing technical information about the document recognition process. If a document profile has been set up that seems unable to recognize the intended document, enabling this option and then trying to capture the document image will produce a file in the terminal 1000 root folder (foot directory) of terminal 1000 called DocumentCapture.log that can be used for performance of diagnostic testing.

The XML file may be edited using an appropriate editor of a software development kit that may be sold with mobile device 1000, offered for download on a website, or otherwise made available, in different illustrative embodiments.

Configuration File: A configuration file can contain several sections, each of which can contain keys that define document parameters, as described as follows for an illustrative embodiment. The first section is always called "Default" in this illustrative Embodiment—this does not itself define a document type, but sets default values used for all document types. Each of the sections after Default does define a document type, and can contain at least the keys for the document's width and height, in this illustrative embodiment. It may also contain other keys to override those in the Default section. System 5000 can be operative so that menu options between corresponding to the following are displayed on display 1222 can be made active. System 5000 can be operative so that any one of the below options can be made active by selection of an appropriate menu option displayed on display 1222. For the present illustrative embodiment, the available keys and their values are:

Width Document width in mm, range: 70 to 450. The value must be accurate otherwise the document may not be recognized.

Height Document height in mm, range: 70 to 450. The value must be accurate otherwise the document may not be recognized.

Tolerance Document aspect ratio tolerance in tenths of a percent, range: 0 to 100, default 20 (i.e. 2.0%). Aspect ratio is defined as the document width divided by the height. If the measured value differs from the theoretical value by more than this percentage then the document image will be rejected. Increase this default value if the document width or height could vary significantly. For example, if two A5 documents were printed on an A4 page then a single document could be produced by folding or tearing the page. However, this is unlikely to be done exactly and would produce variations in document height so the aspect ratio tolerance would probably need to be increased.

Color Mode Color mode of the document either "Color" or "Grayscale". See the information below about file sizes in the description of the "FileType" key. Note that color balance correction will still be carried out for grayscale documents as the image is always captured in color.

TargetR, TargetG, TargetB

Document color balance correction—target average pixel red, green and blue values, range 0 to 255, default 220. If a document is not mainly white then these values will need to be changed, otherwise its colors will not be rendered correctly. To determine what the target values should be, capture an image of the document using natural light and wait for the "Press ENT to save . . . " prompt to appear. Now press the C key and the recommended target average red, green, and blue values will be displayed. If the document repeatedly fails to capture because the resulting image was not sharp enough, this could be because the color balance correction is removing too much document detail so set all minimum document image sharpness values to 0 before trying again, and restore the sharpness values after the target color values have been set. If documents with differing colors need to be captured using the same profile, color balance correction can be disabled by setting all three target values to 0.

Flash Flash mode during the capture process, either "Off", "Automatic" or "On". The default setting of "Automatic" will be appropriate in most cases. If, however, the document is shiny then it may be better to set the flash mode to "Off". If the document will always be imaged in low light conditions then setting the flash mode to "On" will speed up the capture process slightly.

Brightness Brightness adjustment without flash, one of −2.0, −1.5, −1.0, −0.5, 0, 0.5, 1.0, 1.5 or 2.0. The default value of 0 will usually be appropriate unless the document contains large areas of dark colors, in which case a negative adjustment will prevent text "washing out" in lighter areas.

FBrightness Brightness adjustment with flash, one of −2.0, −1.5, −1.0, −0.5, 0, 0.5, 1.0, 1.5 or 2.0. The default value of 0 will usually be appropriate for large documents, but a negative adjustment may be needed for smaller documents (A5 or less) to stop the image being overexposed due to the closeness of the flash LED.

TLSharpness, TRSharpness, BLSharpness, BRSharpness, CSharpness

Minimum document image sharpness requirement for the document's top left, top right, bottom left and bottom right quadrants and the central zone, range: 0 to 100. After a still image is captured, it will first be checked for sharpness. This check is performed over five zones of the document, as show in the diagram of FIG. 18. As seen in FIG. 18, the four quadrants do not quite extend to the document image edge in case the image extends slightly beyond the actual document area, and the central zone overlaps the other four zones. The default values of 20 will normally be appropriate unless a document contains very little detail (e.g. it is mostly blank) in one of these zones, in which case the corresponding sharpness value should be reduced. If a sharpness value is 0 then the corresponding zone will always pass the check.

Shadow Maximum document image shadow amount in percent, range: 0 to 100. The default value of 50 will normally be appropriate unless a document has large dark areas that could be mistaken for shadows, in which case the value should be increased. If the shadow value is 0 then the document will always pass the check.

Sharpen Document image sharpening filter, either "Disabled" or "Enabled". The default value of "Enabled" will normally be appropriate for a document consisting mainly of text and/or solid graphics, but where a document contains areas of halftones (a printing technique that simulates continuous tones by using very small dots of varying sizes and spacing) such as shaded sections or photographs that must be imaged correctly, disabling the filter may actually improve the image quality. Even if the sharpening filter is enabled, note that the image must still meet the specified minimum sharpness standards before the filter is applied in order to be accepted.

Resolution Document image resolution in k pixels, range: 300 to 2048, default 1024 (i.e. 1 megapixel). This may be changed according to the image resolution required, and the image pixel width and height will be calculated from this figure according to the document's aspect ratio. Note, though, that as the resolution is increased from its default towards its maximum value, the resulting images may become less sharp and therefore the minimum document sharpness values may need to be reduced.

FileType Format in which the document image will be saved, either "JPEG Low quality", "JPEG Medium quality", "JPEG High quality", "PNG" or "BMP". JPEG files will be the smallest and the quickest to save. PNG files will be smaller than BMP files, but will take longer to save than BMP, especially for color images. The JPEG file format is designed for saving full color images, so a grayscale JPEG will not be much smaller than the color equivalent. However, grayscale BMP and PNG files are considerably smaller than their color equivalents, and will save more quickly.

Imaging Device Hardware: Returning to FIG. 2, additional detail is provided on an illustrative mobile device 1000 with an image sensor as an exemplary hardware platform for support of operations described herein. Mobile device 1000 may include lens assembly 250 which may be adapted for focusing an image of a document 110 located within a field of view 1240 on a target substrate, onto image sensor array 1033. Field of view 1240 of mobile device 1000 and image sensor array 1033 can be defined by lens assembly 250 in combination with image sensor array 1033. Image sensor 1032 may include multiple pixel image sensor array 1033 having pixels arranged in rows and columns of pixels, associated column circuitry 1034 and row circuitry 1035. Associated with the image sensor 1032 may be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 may be packaged into a common image sensor integrated circuit 1040, in this illustrative embodiment. Image sensor integrated circuit 1040 may incorporate fewer than the noted number of components, in various embodiments.

In one illustrative example, image sensor integrated circuit 1040 can be provided e.g., by an MT9V022 (752×480 pixel array) or an MT9V023 (752×480 pixel array) image sensor integrated circuit available from MICRON TECHNOLOGY, INC. In one illustrative example, image sensor integrated circuit 1040 can be provided by an AV2105 2 Megapixel Color (1600×1200 pixel array) available from ARECONT VISION. In one illustrative example, image sensor integrated circuit 1040 can be provided by an MTD001C12STC 2 megapixel color (1600×1200 pixel array) available from MICRON TECHNOLOGY, INC.

In one illustrative example, image sensor integrated circuit 1040 can incorporate a Bayer pattern filter, so that defined at the image sensor array are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an illustrative embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. In another illustrative embodiment, processor 1060 may, prior to subjecting a frame for further processing, interpolate pixel values intermediate of red pixel positions utilizing red pixel values for development of a monochrome frame of image data. In another illustrative embodiment, processor 1060 may, prior to subjecting a frame for further processing, interpolate pixel values intermediate of blue pixel positions utilizing blue pixel values.

In the course of operation of mobile device 1000, image signals can be read out of image sensor 1032, converted, and stored into a system memory such as RAM 1080. Mobile device 1000 may include one or more memory components 1085, which may illustratively include RAM 1080, a non-volatile memory such as EPROM 1082, a memory storage device 1084, and any of a variety of other types of memory components, in various embodiments. Memory storage device 1084 may illustratively be or include a flash memory, a hard disc drive, any type of RAM, EPROM, EEPROM, DVD-ROM, CD-ROM, or other type of ROM, optical disc, magnetic disc, magnetic cassette, magnetic tape, or any other type of volatile or non-volatile or removable or non-removable memory or data storage components, in illustrative embodiments.

In various illustrative embodiments, mobile device 1000 may include processor 1060 which can be adapted to read out image data stored in memory 1080 and subject such image data to various image processing algorithms. For example, one or more processors 1060 may illustratively be or include a central processing unit (CPU), a complex programmable logic device (CPLD), an application-specific integrated circuit (ASIC), a field programmable gate array (FPGA), or any type of circuit capable of processing logic operations, in accordance with various embodiments.

Mobile device 1000 may include a system bus 1500 providing for bus arbitration, that may include any of a variety of bus structures such as a memory bus or memory controller, a peripheral bus, or a local bus, using any of a variety of architectures, in various embodiments. For example, this may include a Peripheral Component Interconnect (PCI) or Mezzanine bus, an Industry Standard Architecture (ISA) bus, an Enhanced Industry Standard Architecture (EISA) bus, a Micro Channel Architecture (MCA) bus, a Video Electronics Standards Association (VESA) bus, or other bus architectures, in various embodiments. Mobile device 1000 may include a direct memory access unit (DMA) 1070 for routing image information read out from image sensor 1032 that has been subject to conversion to RAM 1080, in various embodiments. Other embodiments of the system bus architecture and/or direct memory access components providing for efficient data transfer between the image sensor 1032 and RAM 1080 may be encompassed in various embodiments.

Server 2000, server 3000, or other computing elements in an illustrative computing system of the present disclosure may similarly include any variety of one or more processors, one or more memory components, one or more system bus or other data communication components, and other components. A memory of system 5000 in different embodiments may include the memories of any of mobile device 1000, server 2000, server 3000, or other elements in a computing and/or network environment.

Mobile device 1000 may include an illumination subsystem 800 for illumination of target area and projection of an illumination pattern 1260, in various embodiments. Illumination subsystem 800 may illustratively include one or more LED flash lamps, one or more continuous LED lamps, one or more xenon flash tubes, or other illumination elements, for example. An illustrative mobile device may also be devoid of illumination subsystem 800, in various embodiments. Illumination pattern 1260, in the embodiment shown in FIGS. 1 and 2, can be projected to be proximate to but larger than an area defined by field of view 1240, but can also be projected in an area smaller than an area defined by a field of view 1240, for example.

In various embodiments, illumination subsystem 800 may also include an illumination lens assembly 300, as is shown in the embodiment of FIG. 2. In addition to or in place of illumination lens assembly 300, illumination subsystem 800 may include alternative light shaping optics, e.g., one or more diffusers, mirrors, and prisms. In use, mobile device 1000 can be oriented by an operator with respect to a target area containing a document 110 bearing decodable indicia 120 in such manner that illumination pattern 1260 is projected on a decodable indicia 120. Decodable indicia 120 may include any type of characters, symbols, or other visually detectable features that are susceptible of being decoded. This may include characters and/or numerals that may be decoded by any of various optical character recognition (OCR) techniques, or a 1D or 2D barcode symbol, as illustrative examples.

Referring to further aspects of mobile device 1000, lens assembly 250 may be controlled with use of electrical power input unit 1202. In one embodiment, an electrical power input unit 1202 may operate as a controlled voltage source, and in another embodiment, as a controlled current source. Illumination pattern light source assembly 500 may be controlled with use of light source control circuit 1206. Light source control circuit 1206 may send signals to illumination pattern light source assembly 500, e.g., for changing a level of illumination output by illumination pattern light source assembly 500. Certain elements of mobile device 1000, e.g., image sensor integrated circuit 1040 (and image sensor array 1033), imaging lens 240, and illumination subsystem 800 may be packaged into an imaging module 400 which may be incorporated into hand held housing 1014. In another illustrative embodiment, a mobile device may not have an illumination subsystem.

Mobile device 1000 may include a number of peripheral devices, illustratively including trigger 1220 which may be used to make active a trigger signal for activating frame readout and/or certain decoding processes, in this illustrative embodiment. Mobile device 1000 may be adapted so that activation of trigger 1220 activates a trigger signal and initiates a decode attempt. Specifically, mobile device 1000 may be operative so that in response to activation of a trigger signal, a succession of frames may be captured by way of read out of image information from image sensor array 1033 (typically in the form of analog signals) and then storage of the image information after conversion into memory 1080 (which may buffer one or more of the succession of frames at a given time). Processor 1060 may be operational to subject one or more of the succession of frames to a decode attempt. Mobile device 1000 in another illustrative embodiment may be devoid of decoding functionality.

In one illustrative embodiment the components of imaging assembly 900 comprising lens assembly 250 and image sensor integrated circuit 1040 may be duplicated in mobile device 1000 and each of the duplicate imaging assemblies 900 may be incorporated in hand held housing 1014 and each may be connected with system bus 1500 and processor 1060 in the manner of imaging assembly 900 as shown in FIG. 2. In this illustrative embodiment, one of the imaging assemblies 900 may be optimized for use in decoding decodable indicia and the other of the imaging assemblies 900 may be optimized for use in capturing and saving frames of image data and representations of features within frames of image data.

For attempting to decode a bar code symbol, e.g., a one dimensional bar code symbol, in an illustrative embodiment, a processor of system 5000 (e.g., processor 1060 of mobile device 1000) can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup, in this illustrative embodiment.

Mobile device 1000 may include various interface circuits for coupling various of the peripheral devices to system address/data bus (system bus) 1500, for communication with processor 1060 also coupled to system bus 1500. Mobile device 1000 may include interface circuit 1028 for coupling image sensor timing and control circuit 1038 to system bus 1500, interface circuit 1102 for coupling electrical power input unit 1202 to system bus 1500, interface circuit 1106 for coupling illumination light source bank control circuit 1206 to system bus 1500, and interface circuit 1120 for coupling trigger 1220 to system bus 1500. Mobile device 1000 may also include a display 1222 coupled to system bus 1500 and in communication with processor 1060, via interface 1122, as well as pointer mechanism 1224 in communication with processor 1060 via interface 1124 connected to system bus 1500. Mobile device 1000 may also include keyboard 1226 coupled to system bus 1500. Keyboard 1226 may be in communication with processor 1060 via interface 1126 connected to system bus 1500. Mobile device 1000 may also include range detector unit 1208 coupled to system bus 1500 via interface 1108.

Mobile device 1000 may capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of mobile device 1000 may be increased (and frame time decreased) by decreasing of a frame picture size. An illustrative embodiment may use an AV2105 image sensor integrated circuit, in which a maximum resolution picture size (1600×1200) may be selected which may yield a frame rate of 24 FPS. Selection of an HDTV windowed picture size (1280×1024) may yield a frame rate of 32 FPS. Using an MT9D001C12 STC image sensor integrated circuit, a maximum resolution picture size (1600×1200) may be selected which can yield a frame rate of 20 FPS. Selection of an SXGA windowed picture size may yield a frame rate of 28 FPS.

An illustrative physical form view of mobile device 1000 in one illustrative embodiment is shown in FIG. 1. Trigger 1220, display 1222, pointer mechanism 1224, and keyboard 1226 may be disposed on a common side of a hand held housing 1014 as shown in FIG. 1. Display 1222, pointer mechanism 1224, and keyboard 1226 in one embodiment may be regarded as a user interface, or user input/output components, of mobile device 1000. Display 1222 in one embodiment may incorporate a touch panel for navigation and virtual actuator selection in which case a user interface of mobile device 1000 can be provided by display 1222. A user interface of mobile device 1000 may also be provided by configuring mobile device 1000 to be operative to be reprogrammed by decoding of programming bar code symbols. A hand held housing 1014 for mobile device 1000 may in another embodiment be devoid of a display and may be in a gun style form factor.

The image processing steps described herein can be distributed among mobile device 1000, servers 2000 and/or 3000 and one embodiment may be executed entirely by mobile device 1000. In such an embodiment, system 5000 may be regarded as being provided by mobile device 1000.

A small sample of illustrative devices, systems, apparatuses, or methods that are described herein is as follows:

A1. A device comprising:
an imaging subsystem, capable of providing image data representative of light incident on said imaging subsystem;
one or more memory components, comprising at least a buffering memory component operatively enabled for temporarily storing the image data; and
one or more processors, enabled for:
receiving the image data from at least a first memory component among the one or more memory components;
attempting to identify linear features defining a candidate quadrilateral form in the image data; and
providing user-perceptible hints via one or more output components for guiding a user to alter positioning of the device to enhance a capability for identifying the linear features defining a candidate quadrilateral form in the image data.

A2. The device of A1, in which the one or more output components comprise a preview monitor enabled for displaying a preview image based on the image data, and in which the one or more processors are further enabled for providing the user-perceptible hints as hint icons displayed on the preview image.

A3. The device of A2, in which the one or more processors are further enabled such that the hint icons comprise traces on the monitor corresponding to identified linear features.

A4. The device of A3, in which the one or more processors are further enabled such that the traces on the monitor corresponding to identified linear features are altered from a first color to a second color to signify successful identification of a candidate quadrilateral form defined by the identified linear features.

A5. The device of A4, in which the one or more memory components further comprise a second memory component, and in which the one or more processors are further enabled for prompting the user to indicate whether a high-resolution image corresponding to the identified candidate quadrilateral form should be stored in the second memory component, where the high-resolution image has a higher resolution than the preview image; and if the user so indicates, then storing the high-resolution image corresponding to the identified candidate quadrilateral form in the second memory component.

A6. The device of A4, in which the one or more memory components further comprise a second memory component, in which the one or more processors are further enabled for responding to the successful identification of the candidate quadrilateral form by storing a high-resolution image corresponding to the identified candidate quadrilateral form in a second memory component, where the high-resolution image has a higher resolution than the preview image.

A7. The device of A2, in which the one or more processors are further enabled such that the hint icons comprise straight indicators displayed on the monitor indicating a direction for translational re-positioning of the device.

A8. The device of A2, in which the one or more processors are further enabled such that the hint icons comprise distance indicators displayed on the monitor indicating a direction for re-positioning of the device closer to or farther from a target.

A9. The device of A2, in which the one or more processors are further enabled such that the hint icons comprise indicators displayed on the monitor indicating a direction to rotate the device.

A10. The device of A2, in which the one or more processors are further enabled such that the hint icons comprise an excessive motion indicator displayed on the monitor indicating that at least one of the imaging system and/or a candidate quadrilateral form are exhibiting excessive motion interfering with the capability for identifying linear features defining the candidate quadrilateral form.

A11. The device of A2, in which the one or more processors are further enabled such that the hint icons comprise a partial shadow indicator displayed on the monitor indicating that an apparent partial shadow is obscuring a candidate quadrilateral form.

A12. The device of A2, in which the one or more processors are further enabled such that attempting to identify linear features defining a candidate quadrilateral form in the image data comprises:

generating a reduced resolution frame based on an input frame of the image data, the reduced resolution frame comprising fewer pixels than the input frame, in which a pixel in the reduced resolution frame combines information from two or more pixels in the input frame;

displaying the reduced resolution frame on the monitor as the preview image; and attempting to identify the linear features defining a candidate quadrilateral form in the reduced resolution frame.

A13. The device of A12, in which the one or more processors are further enabled such that attempting to identify linear features defining a candidate quadrilateral form in the image data comprises:

attempting to identify transition pairs comprising pairs of adjacent pixels in the reduced resolution frame having differences between the pixels that exceed a pixel transition threshold;

attempting to identify one or more linear features in the reduced resolution frame between two or more identified transition pairs; and providing an indication of one or more identified linear features in the reduced resolution frame.

A14. The device of A13, in which the one or more processors are further enabled such that attempting to identify linear features defining a candidate quadrilateral form in the image data comprises:

connecting consecutive identified pixel transitions into identified line segments, identifying sets of line segments that are approximately in-line with each other, and merging identified sets of in-line line segments into identified linear features;

measuring angles between identified linear features;

evaluating whether the measured angles are within a constrained skew value around 90 degrees, and if they are, then identifying intersections of the linear features as identified corner points;

evaluating whether four linear features with four corner points can be identified, and if they are not identified, then providing, on the preview monitor, the hint icons for guiding a user to alter positioning of the device to enhance a capability for identifying four linear features with four corner points.

A15. A method, performed using one or more processors, comprising:

receiving a frame of image data from an imaging component;

generating, using at least one of the processors, a reduced resolution frame based on the input frame, the reduced resolution frame comprising fewer pixels than the input frame, in which each pixel of a plurality of pixels in the reduced resolution frame combines information from two or more pixels in the input frame;

attempting, using at least one of the processors, to identify linear features defining a candidate quadrilateral form in the image data; and determining, using at least one of the processors, graphical operator hint icons for guiding a user to alter positioning of the imaging component to enhance a capability for identifying the linear features defining a candidate quadrilateral form in subsequent image data; and providing the graphical operator hint icons via an output component.

A16. The method of A15, in which the method further comprises providing an image of the reduced resolution frame and the graphical operator guidance icons on a preview monitor, and the graphical operator guidance icons are selected from among straight indicators indicating a direction for translational re-positioning of the imaging component, distance indicators indicating a direction for re-positioning of the device forward or backward, curved indicators indicating a direction to rotate the device, an excessive motion indicator indicating that the image data are exhibiting excessive motion, and a partial shadow indicator indicating that an apparent partial shadow is obscuring a candidate quadrilateral form.

A17. A computer-readable storage medium comprising executable instructions capable of enabling one or more computing elements, including one or more processors, for:
receiving a first frame of image data;
attempting to identify linear features defining a candidate quadrilateral form in the first frame of image data; and
providing user-perceptible hints for guiding a user to alter positioning of the device to enhance a capability for identifying the linear features defining a candidate quadrilateral form in a subsequent frame of image data.

A18. The computer-readable storage medium of A17, in which the executable instructions are further capable of enabling the one or more computing elements for:
storing a plurality of graphical icons to be used for the user-perceptible hints;
evaluating one or more reasons for the image data being non-optimal;
selecting one or more of the graphical icons for addressing the one or more evaluated reasons for the image data being non-optimal; and
displaying the one or more selected graphical icons on a preview monitor that also displays the candidate quadrilateral form.

A19. The computer-readable storage medium of A18, in which the executable instructions are further capable of enabling the one or more computing elements for selecting from among straight indicator graphical icons indicating a direction for translational re-positioning of the imaging component, distance indicator graphical icons indicating a direction for re-positioning of the device forward or backward, curved indicator graphical icons indicating a direction to rotate the device, an excessive motion indicator graphical icon indicating that the image data are exhibiting excessive motion, and a partial shadow indicator graphical icon indicating that an apparent partial shadow is obscuring a candidate quadrilateral form.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. A device, comprising: an imaging subsystem for generating image data; a monitor for displaying an image; and a processor enabled for: receiving the image data; generating a reduced resolution frame based on an input frame of the image data, the reduced resolution frame comprising fewer pixels than the input frame; attempting to identify linear features defining a candidate quadrilateral form in the image data; displaying the reduced resolution frame on the monitor; and providing a user-perceptible hint as hint icons in the displayed reduced resolution frame for guiding a user to alter positioning of the device to improve the device's capability for identifying linear features defining a candidate quadrilateral form in the image data.

2. The device of claim 1, wherein a pixel in the reduced resolution frame combines information from two or more pixels in the input frame.

3. The device of claim 1, wherein the user-perceptible hints comprises a hint icon.

4. The device of claim 3, wherein the hint icon comprises a trace corresponding to an identified linear feature.

5. The device of claim 4, wherein the trace corresponding to an identified linear feature is altered from a first color to a second color to signify successful identification of a candidate quadrilateral form defined by the identified linear features.

6. The device of claim 1, wherein, in response to the successful identification of linear features defining a candidate quadrilateral form and user input confirming the identification, the devices stores a high resolution image corresponding to the candidate quadrilateral form in memory.

7. The device of claim 1, wherein the user-perceptible hint comprises a straight indicator indicating a direction for translational re-positioning of the device.

8. The device of claim 1, wherein the user-perceptible hint comprises a distance indicator indicating a direction for re-positioning of the device closer to or farther from a target.

9. The device of claim 1, wherein the user-perceptible hint comprises an indicator indicating a direction to rotate the device.

10. The device of claim 1, wherein the user-perceptible hint comprises an excessive motion indicator indicating that the imaging subsystem and/or a candidate quadrilateral form are exhibiting excessive motion interfering with the capability for identifying linear features defining the candidate quadrilateral form.

11. The device of claim 1, wherein the user-perceptible hint comprises a partial shadow indicator indicating that an apparent partial shadow is obscuring a candidate quadrilateral form.

12. The device of claim 1, wherein the processor is enabled for:
attempting to identify transition pairs comprising pairs of adjacent pixels in the reduced resolution frame having differences between the pixels that exceed a pixel transition threshold;
attempting to identify a linear feature in the reduced resolution frame between two or more identified transition pairs; and
providing an indication of an identified linear feature in the reduced resolution frame.

13. The device of claim 12, wherein the processor is enabled for:
connecting consecutive identified pixel transitions into identified line segments;
identifying sets of line segments that are approximately in-line with each other;
merging identified sets of in-line line segments into identified linear features;
measuring angles between identified linear features;
evaluating whether the measured angles are within a constrained skew value around 90 degrees, and if they are, then identifying intersections of the linear features as identified corner points; and
evaluating whether four linear features with four corner points can be identified, and if they are not identified, then providing, on the monitor, the hint icons for guiding a user to alter positioning of the device to enhance a capability for identifying four linear features with four corner points.

14. A device, comprising: an imaging subsystem for generating image data; a monitor for displaying an image; and a processor enabled for: receiving the image data; generating a reduced resolution frame based on an input frame of the image data, the reduced resolution frame comprising fewer pixels than the input frame; attempting to identify linear features defining a candidate quadrilateral form in the image data; displaying the reduced resolution frame on the monitor; providing a user-perceptible hint as hint icons in the displayed reduced resolution frame for guiding a user to alter positioning of the device to improve the device's capability for identifying linear features defining a candidate quadrilateral form in the image data; and in response to the successful identification of linear features defining a candidate quadrilateral form, storing a high resolution image corresponding to the candidate quadrilateral form in memory.

15. The device of claim 14, wherein the user-perceptible hint comprises a straight indicator indicating a direction for translational re-positioning of the device.

16. The device of claim 14, wherein the user-perceptible hint comprises an indicator indicating a direction to rotate the device.

17. A method, comprising: receiving image data from an imaging subsystem within a device; generating, with a processor in the device, a reduced resolution frame based on an input frame of the image data, the reduced resolution frame comprising fewer pixels than the input frame; attempting, with the processor, to identify linear features defining a candidate quadrilateral form in the image data; displaying the reduced resolution frame on a monitor; and providing a user-perceptible hint as hint icons in the displayed reduced resolution frame for guiding a user to alter positioning of the device to improve the device's capability for identifying linear features defining a candidate quadrilateral form in the image data.

18. The method of claim 17, wherein the user-perceptible hint comprises a straight indicator indicating a direction for translational re-positioning of the device.

19. The method of claim 17, comprising:
attempting, with the processor, to identify transition pairs comprising pairs of adjacent pixels in the reduced resolution frame having differences between the pixels that exceed a pixel transition threshold;
attempting, with the processor, to identify a linear feature in the reduced resolution frame between two or more identified transition pairs; and
providing, with the monitor, an indication of an identified linear feature in the reduced resolution frame.

20. The method of claim 19, comprising:
connecting, with the processor, consecutive identified pixel transitions into identified line segments;
identifying, with the processor, sets of line segments that are approximately in-line with each other;
merging, with the processor, identified sets of in-line line segments into identified linear features;
measuring, with the processor, angles between identified linear features;
evaluating, with the processor, whether the measured angles are within a constrained skew value around 90 degrees, and if they are, then identifying intersections of the linear features as identified corner points; and
evaluating, with the processor, whether four linear features with four corner points can be identified, and if they are not identified, then providing, on the monitor, the hint icons for guiding a user to alter positioning of the device to enhance a capability for identifying four linear features with four corner points.

* * * * *